United States Patent [19]
Kato et al.

[11] Patent Number: 5,513,020
[45] Date of Patent: Apr. 30, 1996

[54] STEREOSCOPIC DISPLAY APPARATUS USE A HOLOGRAPHIC PHASE DISTRIBUTION FORMED FROM TWO-DIMENSIONAL IMAGES

[75] Inventors: Masayuki Kato; Hirokazu Arikate; Manabu Ishimoto; Noriko Sato; Masato Nakashima, all of Kawasaki, Japan

[73] Assignee: Fujitsu Limited, Kawasaki, Japan

[21] Appl. No.: 113,897

[22] Filed: Aug. 31, 1993

[30] Foreign Application Priority Data

Sep. 18, 1992 [JP] Japan ................................ 4-248988

[51] Int. Cl.$^6$ ..................................................... G03H 1/08
[52] U.S. Cl. .................................. 359/9; 359/22; 359/23
[58] Field of Search ................................. 359/9, 22, 23; 382/44; 395/120

[56] References Cited

U.S. PATENT DOCUMENTS

| | | | |
|---|---|---|---|
| 3,614,426 | 10/1971 | Douzelle | 359/9 |
| 3,843,225 | 10/1974 | Kock et al. | 359/23 |
| 4,120,569 | 10/1978 | Richards, Jr. | 359/11 |
| 4,834,476 | 5/1989 | Benton | 359/23 |
| 5,117,296 | 5/1992 | Hoebing | 359/22 |
| 5,138,471 | 8/1992 | McGrew | 359/22 |
| 5,227,898 | 7/1993 | Iavecchra et al. | 359/9 |
| 5,400,155 | 3/1995 | Ueda et al. | 359/9 |

FOREIGN PATENT DOCUMENTS 06130881  5/1994  Japan ............................ 359/9

OTHER PUBLICATIONS

Yatagai, T. "Stereoscopic Approach to 3–D Display Using Computer Generated Holograms", Applied Optics, vol. 15, No. 11, Nov. 1976, NY, pp. 2722–2729.

Primary Examiner—Frank Gonzalez
Assistant Examiner—Jason D. Eisenberg
Attorney, Agent, or Firm—Staas & Halsey

[57] ABSTRACT

Three-dimensional information for each object structure is used to provide a 2-dimensional plane to obtain a 2-dimensional image. Two-dimensional images by the projection seen from a plurality of points, which were finely divided on a hologram forming surface are formed on the 2-dimensional setting plane. As for an electronic hologram, a phase distribution at the hologram forming surface is calculated from the 2-dimensional images of each figure structure. The calculated phase distribution is displayed on a liquid crystal display or the like. A reference light is irradiated onto the phase distribution and is converted into an optical wave front, thereby displaying a solid image. In case of forming a hologram recording medium, each of the 2-dimensional images of a plurality of structures is multiplexingly exposed and the exposed regions are finely divided on a dry plate.

23 Claims, 26 Drawing Sheets

SHIFT TO NEAR POSITION   REFERENCE   SHIFT TO FAR POSITION

STEREOSCOPIC DISPLAY APPARATUS USE A HOLOGRAPHIC PHASE DISTRIBUTION FORMED FROM TWO-DIMENSIONAL IMAGES

BACKGROUND OF THE INVENTION

The present invention relates to a stereoscopic display method of a hologram and its forming method and its stereoscopic display apparatus for performing a stereoscopic display by forming a hologram of a virtual object or an object which actually exists and, more particularly, to a stereoscopic display method of a hologram and its forming method and its stereoscopic display apparatus for performing a natural stereoscopic display by using 2-dimensional images.

A stereoscopic display is a display for enabling a depth and a thickness of a 3-dimensional object to be visually understood. Such a stereoscopic display is largely demanded in the display of structure designed by a CAD or the like, the display of medical images, or the like. A solid image is impressive as compared with a 2-dimensional display and is also used in a display for amusement in an amusement park, a movie, or the like.

Hitherto, various kinds of methods have already been proposed with respect to the stereoscopic display. There is a hologram as a stereoscopic display which can see a solid image without putting special glasses. According to the hologram, an object image is recorded by using the interference operation of the light. With regard to a still object, a color hologram having an enough depth feeling has already been manufactured.

As a method of stereoscopically displaying a virtual object having a 3-dimensional structure formed by the CAD or the like, there is a computer graphics (CG) method. The computer graphics method relates to a technique for calculating a 2-dimensional image when a target is seen from a predetermined direction and for expressing it with a reality in consideration of the reflection or shadow of the light. However, since the computer graphics show a 2-dimensional image, a stereoscopic feeling is insufficient.

An image having a stereoscopic feeling can be displayed by a holographic stereogram method whereby 2-dimensional images which are obtained by seeing an object from various directions on the basis of the 2-dimensional image by the computer graphics are sequentially recorded into stripe-like regions each having a microwidth in the horizontal direction and a width of the screen in the vertical direction by the holographic exposure.

According to the conventional holographic stereogram method, however, the 2-dimensional image is fundamentally seen and the plane with which a focal point of the eyes coincides doesn't coincide with the position of the image which is seen by the parallax of both eyes and recognized. Therefore, it is hard to see the image and such a state becomes a cause of fatigue. Particularly, in case of displaying a deep image, a burden on the eyes increases and such a stereoscopic display is unpreferable. The conventional hologram is inconvenient as a stereoscopic display system because it is recorded on a film-like medium and it takes a time to perform a developing process. Further, the display contents cannot be rewritten.

SUMMARY OF THE INVENTION

According to the invention, stereoscopic display method and apparatus of a hologram which can perform a natural stereoscopic display on the basis of a 2-dimensional image are provided. First, a stereoscopic display method of a hologram of the invention comprises:

- a 3-dimensional information forming step of forming 3-dimensional information of an object to be displayed by a CAD or the like;
- an image forming step of forming a plurality of 2-dimensional images from the 3-dimensional information on a predetermined figure structure unit basis;
- a phase distribution calculating step of calculating a phase distribution at a hologram forming surface from the plurality of 2-dimensional images formed in the image forming step;
- a hologram expressing step of expressing the phase distribution obtained in the phase distribution calculating step onto the hologram forming surface; and
- a wave front converting step of irradiating a reference light to the phase distribution expressed in the hologram expressing step and converting the reference light into the optical wave front, thereby displaying a solid image.

According to the invention, there is provided a hologram forming method of forming a hologram medium by multiple exposure of a plurality of 2-dimensional images obtained from the 3-dimensional information by dividing an object every object structure. That is, a recording medium of the hologram is formed by the multiple exposure based on the 2-dimensional images formed every object structure.

In the formation of the 2-dimensional image according to the invention, 3-dimensional information to be expressed is divided every object structure and the 3-dimensional figure data is formed from the 3-dimensional information with respect to a plurality of object structures. A 2-dimensional plane to form the 2-dimensional data is set every divided figure structure. For example, a plane is set so as to pass the center of gravity of the figure and to minimize the average distance between the plane and the surface constructing the figure. On the 2-dimensional plane set every figure structure, the projection image data when it is seen from a segment hologram region as a minimum unit of the hologram expression which was finely divided on the hologram forming surface is produced as 2-dimensional data from the 3-dimensional image data every figure structure.

In the calculation of the phase distribution of the invention, with respect to each segment hologram as a minimum unit obtained by finely dividing the hologram forming surface, phases are calculated on the basis of the 2-dimensional pixels constructing the 2-dimensional image obtained by the projection, thereby obtaining a phase distribution on the hologram forming surface. The phase distributions obtained every plurality of 2-dimensional images are added every segment hologram at the same position, thereby obtaining a phase distribution on the hologram forming surface of the synthesized 2-dimensional image.

According to the invention, a space phase distribution of the hologram is calculated from a plurality of 2-dimensional images having a depth. Such a phase distribution is expressed by means for spatially modulating an amplitude or phase of a reference light (reproduction light). By irradiating a reference light to the phase distribution and by converting the reference light into the optical wave front, a rewritable stereoscopic display can be performed. In the formation of a recording medium of a hologram, a plurality of 2-dimensional images each having a depth are multiplexed and recorded by the light interference exposure, thereby forming segment holograms. By arranging and recording the segment holograms onto a hologram dry plate, a hologram recording medium can be formed. An ordinary hologram display can be executed by using such a recording medium.

According to the stereoscopic display using the phase distribution or hologram recording medium formed from a plurality of 2-dimensional images each having a depth, the gradation display is executed in the depth direction of the 2-dimensional image. A deviation between the distance feeling of the stereoscopic display image which is seen and recognized by the parallax of both eyes and the distance feeling which is sensed by a focus adjusting function of the eyes is reduced. A fatigue when a solid image is seen is reduced. A natural stereoscopic feeling is obtained.

The above and other objects, features, and advantages of the present invention will become more apparent form the following detailed description with reference to the drawings.

DETAILED DESCRIPTION OF THE PREFERRED EMBODIMENT (Fundamental construction of stereoscopic display method)

Figure 1:
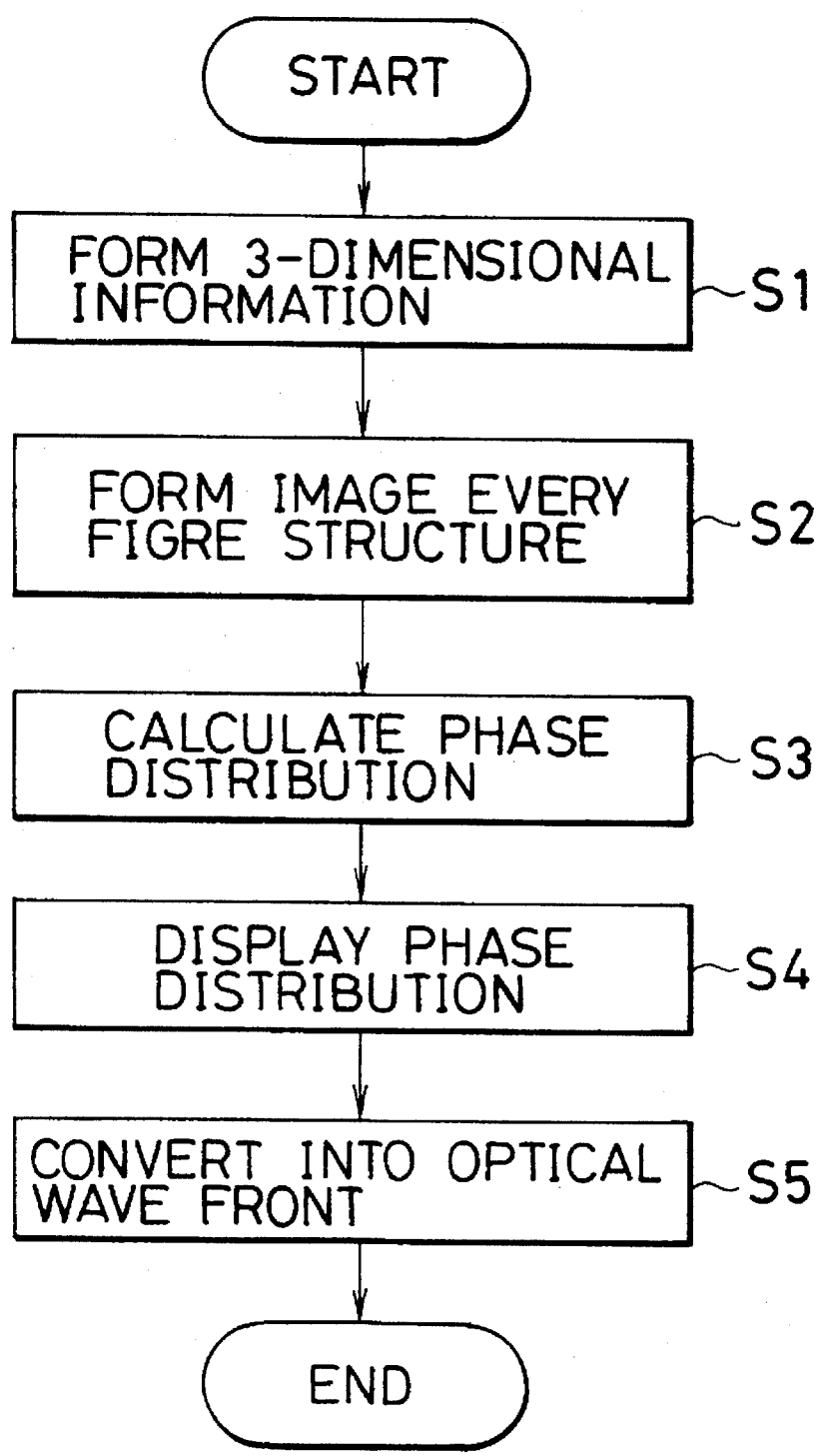
FIG. 1 is a flowchart showing a fundamental processing procedure of a stereoscopic display method according to the invention.

A flowchart of FIG. 1 shows a fundamental processing procedure of a stereoscopic display method of a program according to the invention. First, in step S1, 3-dimensional information of an object or object group to be displayed is formed. In the formation of the 3-dimensional information, it is obtained from the 3-dimensional image data by a CAD system or from the 2-dimensional data obtained by photographing an object by a CCD camera or the like. In step S2, the 3-dimensional information is divided on a predetermined figure structure unit basis and is converted into the 2-dimensional information, thereby forming a plurality of 2-dimensional images in which 2-dimensional planes also exist in the depth direction. In the formation of the 2-dimensional images, a 2-dimensional plane is set every plurality of objects to be displayed when they are seen from the hologram forming surface and the 2-dimensional image data is formed by projecting onto the 2-dimensional planes on the basis of the 3-dimensional data formed every object. In step S3, a phase distribution at the hologram forming surface is calculated from the 2-dimensional image data formed as projection data for every object. In step S4, the calculated phase distribution is expressed on the hologram forming surface. A reference light is finally irradiated onto the phase distribution and is converted into an optical wave front according to the phase distribution, thereby displaying a solid image.

Figure 2:
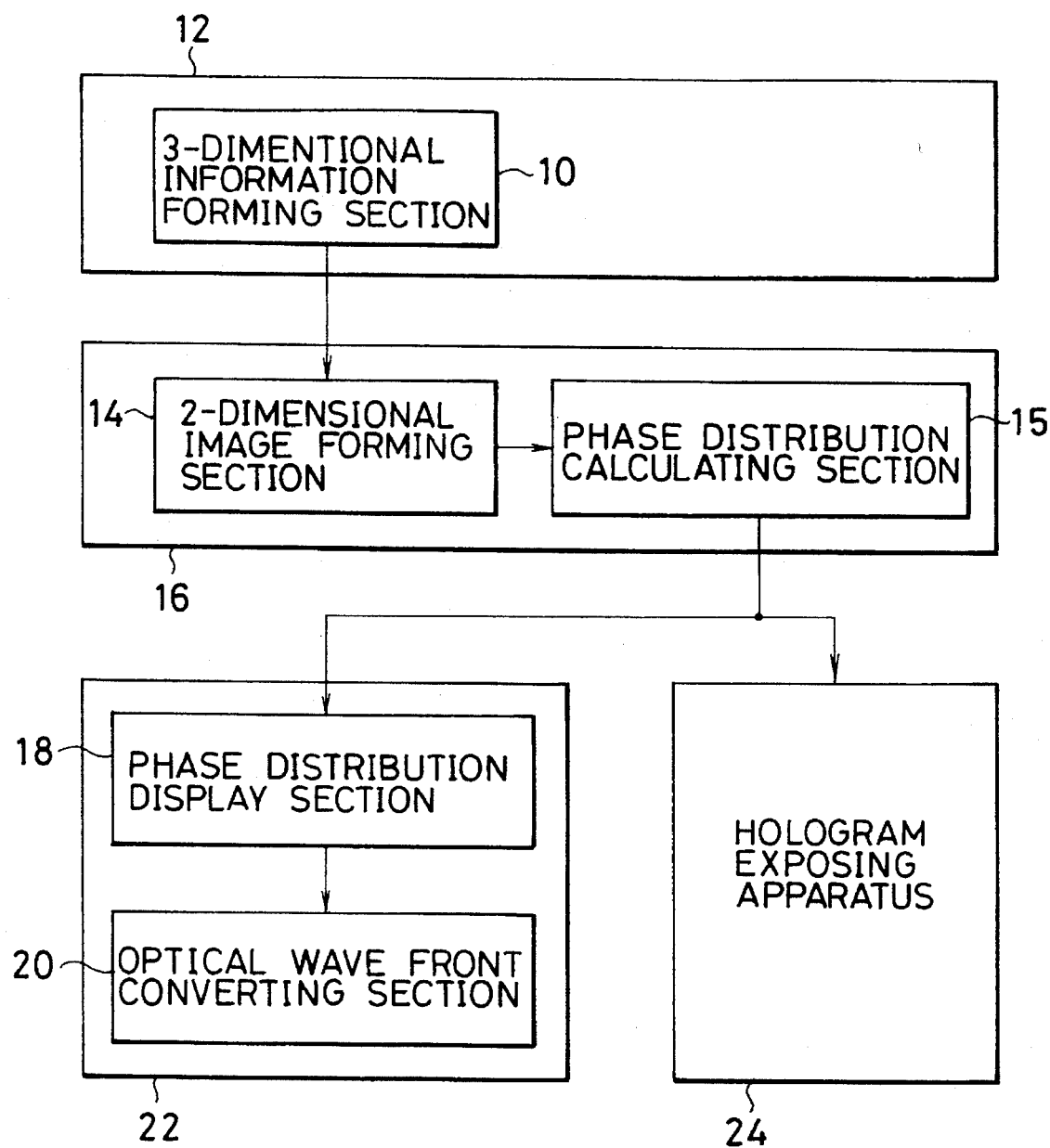
FIG. 2 is a block diagram showing a fundamental apparatus construction of the invention.

FIG. 2 shows a fundamental construction of an apparatus for realizing the stereoscopic display method of FIG. 1. A 3-dimensional information forming section 10 is realized by, for example, a CAD system 12. 10 (for example, a CAD system 12) forms the 3-dimensional information including a plurality of objects to be displayed. The 3-dimensional information of the 3-dimensional information forming section 10 is divided for each object and is given to the 2-dimensional image forming section 14. The 2-dimensional image forming section 14 forms a 2-dimensional image from each of the 3-dimensional information. The 2-dimensional images formed by the 2-dimensional image forming section 14 are given to a phase distribution calculating section 15, by which a phase distribution at the hologram forming surface is calculated. The 2-dimensional image forming section 14 and the phase distribution calculating section 15 are realized by a computer 16. The result of the calculation of the phase distribution calculating section 15 is sent to a phase distribution display section 18. A solid image is displayed by an optical wave front converting section 20. The phase distribution display section 18 and the optical wave front converting section 20 construct a hologram display apparatus 22. On the other hand, a plurality of 2-dimensional image data which was formed by the 2-dimensional image forming section 14 and was obtained by dividing every object is supplied to a hologram exposing apparatus 24 and is recorded on a hologram dry plate as a recording medium by the multiple exposure, so that a hologram as a fixed record can be formed. Each of the processing steps in FIG. 1 will now be described in detail hereinbelow.

(Formation of 3-dimensional information)

Figure 3:
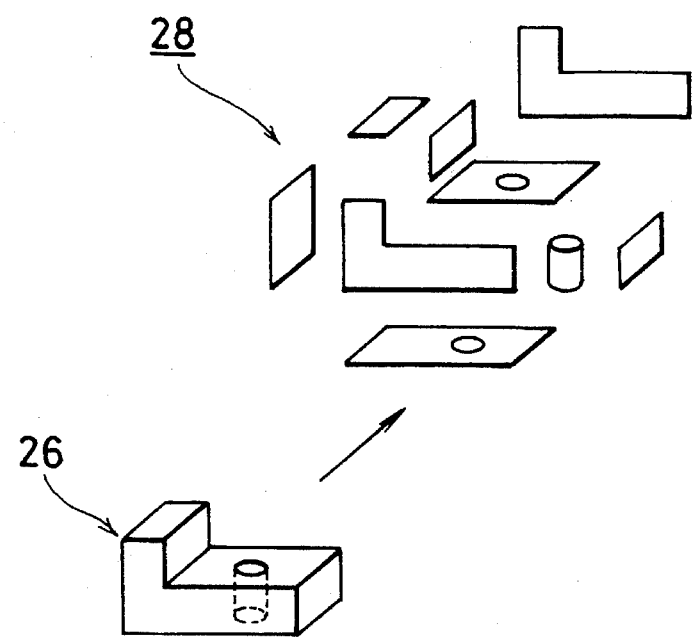
FIG. 3 is an explanatory diagram of an expressing method of 3-dimensional structure data in a CAD system.
Figure 4:
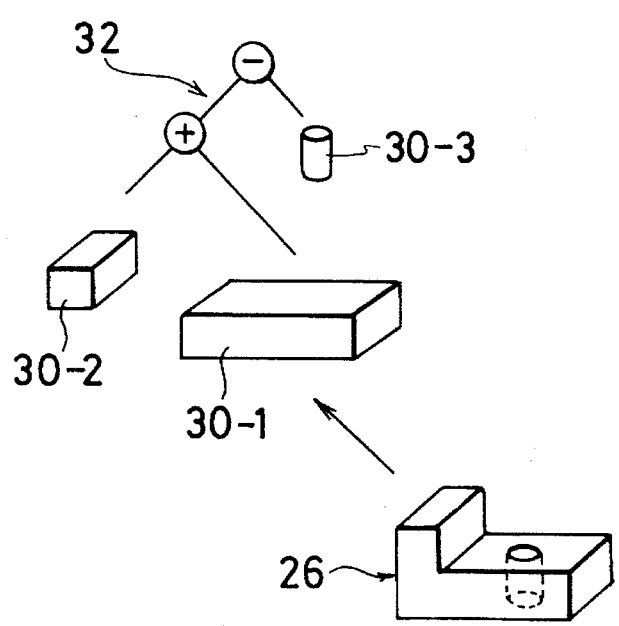
FIG. 4 is an explanatory diagram of another expressing method of 3-dimensional structure data in the CAD system.

In the formation of the 3-dimensional information of an object to be stereoscopically displayed, for example, an expressing method of 3-dimensional data in the computer graphics can be used. For instance, in case of describing a 3-dimensional structure by a solid model, as shown in FIG. 3, a target 26 having a 3-dimensional structure is separated into a set of planes 28 and 3-dimensional data in which lists of ridgelines or vertexes of the planes are linked is formed. As shown in FIG. 4, the object 26 is expressed by a set of fundamental FIGS. 30-1, 30-2, and 30-3 and the object 26 is expressed by using logical operational expressions 32 of the fundamental FIGS. 30-1 to 30-3. The expressing methods of the 3-dimensional data shown in FIGS. 3 and 4 are widely used in the field of the computer graphics. For example, as shown in FIG. 1, the 3-dimensional data which is used in the invention can be formed from the CAD data by using the CAD system.

(Formation of 2-dimensional images for every figure structure)

Figure 5:
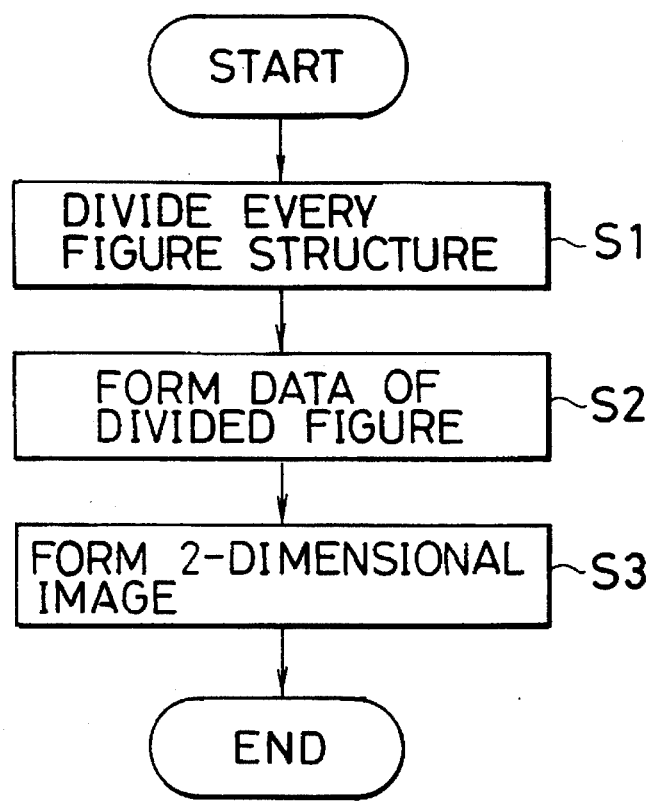
FIG. 5 is a flowchart showing the details of the image forming procedure of FIG. 1.

A flowchart of FIG. 5 shows a step of forming 2-dimensional images also including the component in the depth direction in the invention.

In step S1, 3-dimensional data is divided for each object. In step S2, 3-dimensional image data is formed for each divided object. Finally, in step S3, 2-dimensional image data is synthesized by a projecting process of each 3-dimensional image data, thereby forming 2-dimensional image data.

Figure 6:
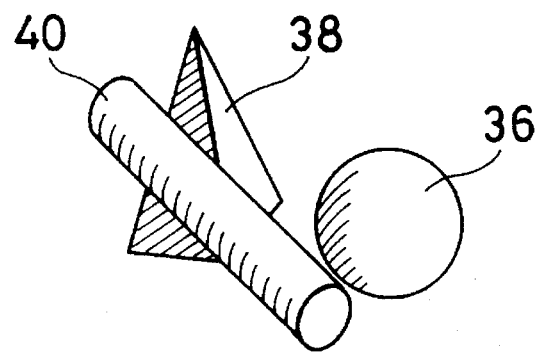
FIG. 6 is an explanatory diagram of three objects to be displayed by a hologram according to the invention.
Figure 7:
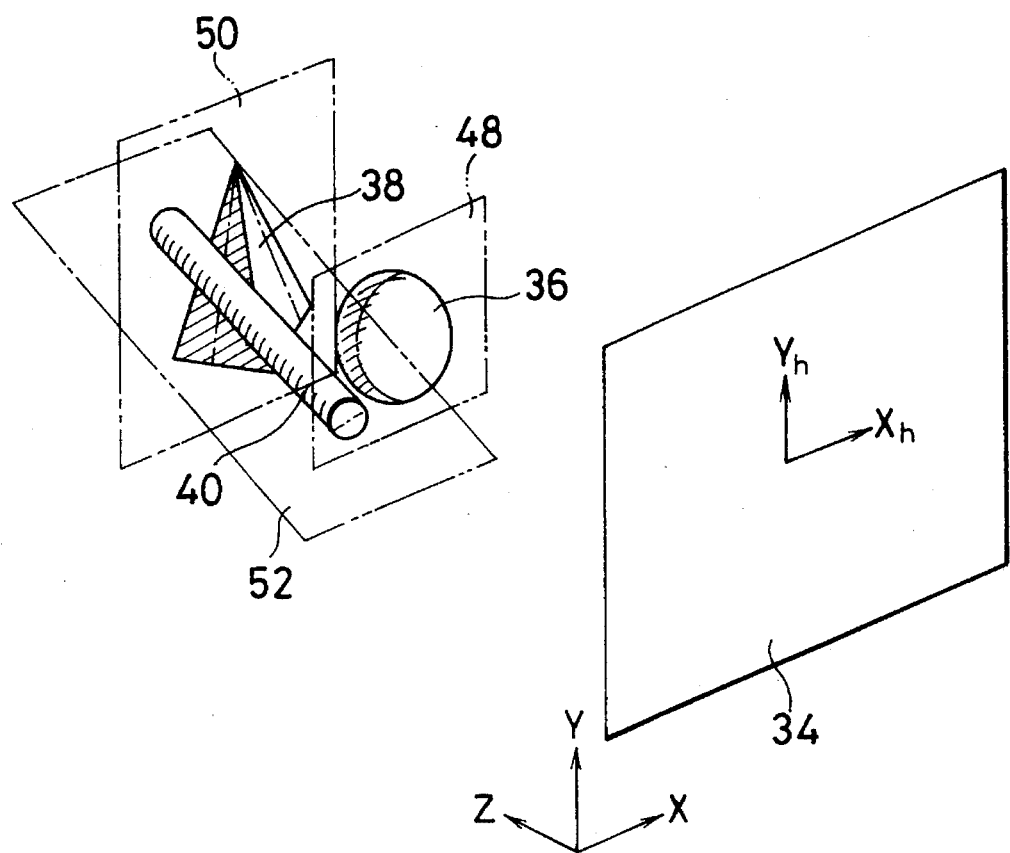
FIG. 7 is an explanatory diagram showing the setting of 2-dimensional planes in the case where a figure of FIG. 6 was divided as a target every figure according to the invention.

FIG. 6 shows a 3-dimensional space in which three objects such as sphere 36, a triangular cone 38, and a cylindrical body 40 exist in the depth direction as targets to be displayed according to the invention. As for such figures in the 3-dimensional space, according to the invention, as shown in FIG. 7, a hologram forming surface 34 is set at an arbitrary position for the sphere 36, triangular cone 38, and cylindrical body 40. As coordinate axes in the target space, the lateral direction of the hologram forming surface 34 is set to an X axis, the vertical direction is set to a Y axis, and the depth direction is set to a Z axis. A 2-dimensional coordinate system of independent 2-dimensional coordinates $X_h$ and $Y_h$ are set to the hologram forming surface 34. 3-dimensional data of the sphere 36, triangular cone 38, and cylindrical body 40 existing in the target space is individually formed. When the 3-dimensional data of the sphere 36, triangular cone 38, and cylindrical body 40 is formed, 2-dimensional image data is formed every figure structure.

2-dimensional planes 48, 50, and 52 are set as 2-dimensional planes to form the 2-dimensional image data with respect to each of the sphere 36, triangular cone 38, and cylindrical body 40. Specifically speaking, with respect to the sphere 36, the 2-dimensional plane 48 which passes through the center of gravity and is parallel with the hologram forming surface 34 is set. As for the triangular cone 38, the 2-dimensional plane 50 which passes through the center of gravity and is parallel with the hologram forming surface 34 is set. Further, as for the cylindrical body 40, the 2-dimensional plane 52 which passes through the axial center including the center of gravity and is not parallel with the hologram forming surface 34 is set. The rule upon setting of the planes is based on a fundamental rule such that a place which passes through the center of gravity of the figure is set. Further, with respect to any figure, such a plane is set so that the average distance between the set 2-dimensional plane and the surface of the figure is set to the minimum value or a value near the minimum value. As another rule of setting the 2-dimensional plane, in the case where the data has, for instance, a boxel form, it is also possible to set the 2-dimensional plane in a manner such that after the center of gravity was calculated, the presence or absence of the data is radially traced from the center of gravity and a minor axis is set in such a direction that the connection of the data is shortest and a plane which is perpendicular to the minor axis and passes through the center of gravity is set. A method of setting the plane as mentioned above can be properly determined as necessary.

After the 2-dimensional planes 48, 50, and 52 were set, 2-dimensional image data as projection images of the sphere 36, triangular cone 38, and cylindrical body 40 when they are seen on the hologram forming surface 34 from different visual points is produced every figure for each of the 2-dimensional planes 48, 50, and 52. One or a plurality of figures existing as a background such that the distance from the hologram forming surface 34 exceeds a predetermined distance and becomes far are regarded as one figure structure. A 2-dimensional plane is set at a position of the farthest distance in the depth direction when it is seen from the hologram forming surface 34. The projection data of all of the figures which are seen as a background is formed as 2-dimensional image data onto such a 2-dimensional plane.

Figure 8:
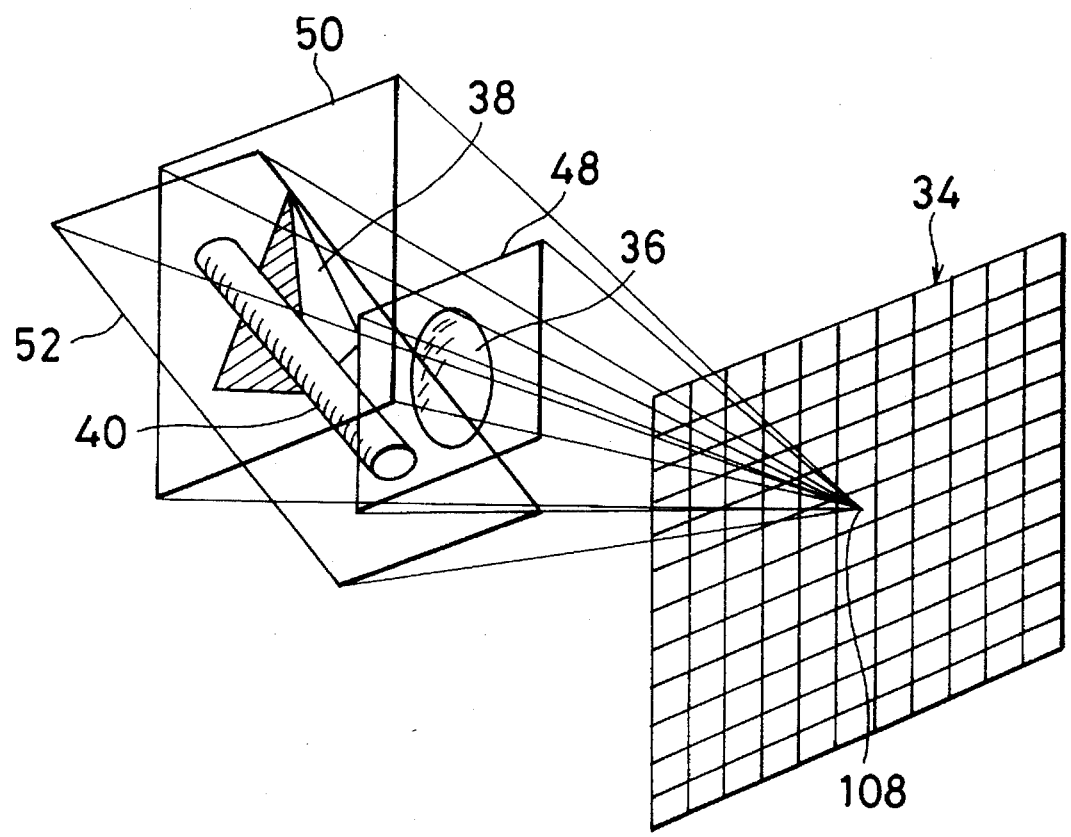
FIG. 8 is an explanatory diagram showing the formation of projection 2-dimensional data for the 2-dimensional plane set in FIG. 7.
Figure 9A:
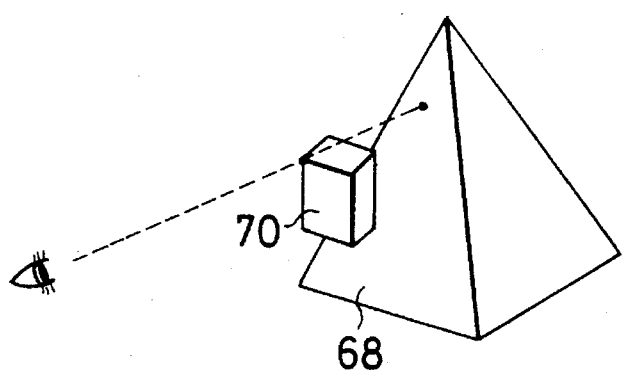
FIGS. 9A and 9B are explanatory diagrams showing the relation between the positions of two objects and the projection data in case of forming projection 2-dimensional data.
Figure 9B:
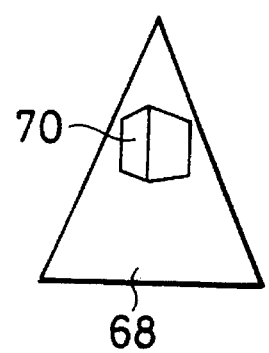
Figure 10A:
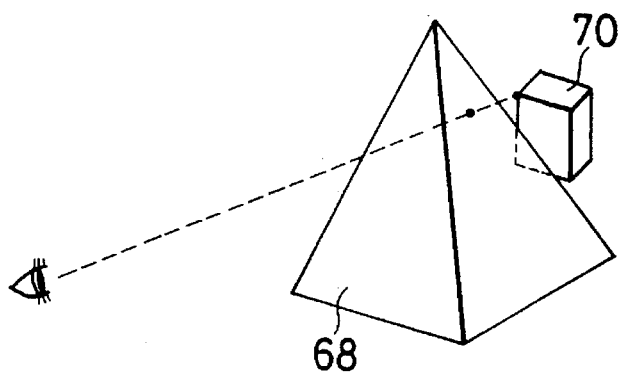
FIGS. 10A and 10B are explanatory diagrams of projection data in the case where the targets in FIG. 8 are replaced in the front and rear directions.
Figure 10B:
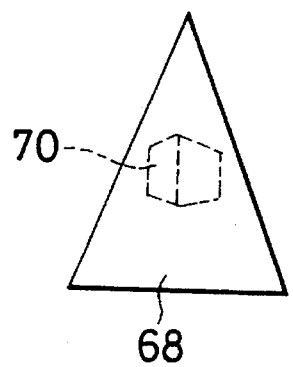

FIG. 8 shows the forming principle of the 2-dimensional images in FIG. 7. First, the hologram forming surface 34 is matrix divided and segment holograms 108 as minimum units of the hologram expression are formed. Sizes in both of the vertical and lateral directions of the segment hologram 108 are set to about 1 mm or less. In the diagram, each segment hologram 108 is largely shown for convenience of explanation. Subsequently, 2-dimensional pixel information when the sphere 36, triangular cone 38, and cylindrical body 40 are seen while setting each of the segment holograms 108 of the hologram forming surface 34 into a visual point is formed as 2-dimensional image data projected onto the 2-dimensional planes 48, 50, and 52. For example, in the sphere 36 of the first 2-dimensional plane 48 on this side, 3-dimensional pixel data expressing the sphere 36 when it is seen by setting a visual point to the central segment hologram 108 of the hologram forming surface 34 is converted into the 2-dimensional pixel data on the 2-dimensional plane 48. Such a method of forming the 2-dimensional images when the target is seen from a plurality of different directions every figure on the basis of the 3-dimensional data as mentioned above can be realized by using the conventional 3-dimensional display technique in the computer graphics. In this case, a process for a hidden line or a hidden plane is also included so that the side surface changes depending on the observing direction. For example, in the case where a target 70 exists in front of a target 68 as shown in FIG. 9A, a hidden plane process is executed so that a part of the surface of the target 68 doesn't appear by the target 70 as shown in FIG. 9B. In the case where the target 70 exists behind the target 68 on the contrary as shown in FIG. 10A, the hidden plane process is executed so that the target 70 doesn't appear on the surface of the target 68 as shown in FIG. 10B. With respect to the projection when the 2-dimensional image is formed every figure, 2-dimensional image data is formed by the projection which becomes radial around the segment hologram 108 on which the visual point is set as an origin in a manner such that even when the sphere 36, triangular cone 38, and cylindrical body 40 are displayed at different distances, three images are continuous upon observation.

When the sizes in the vertical and lateral directions of each segment hologram 108 are small to be 1 mm or less, even when the visual point is moved on a unit basis of the segment hologram 108 and the 2-dimensional image data is produced or even when the 2-dimensional images displayed at positions of different distances in the depth direction are overlapped, continuity is not lost. In case of forming 2-dimensional image data when they are seen by setting the visual point to each position of the segment holograms 108 which were divisionally formed on the hologram forming surface 34, as a positional change between the adjacent segment holograms 108, a value of about 0.3° to 1° is sufficient in a change in observing direction of a target. Therefore, in place of moving the visual point while dividing the hologram forming surface 34 into regions of a plurality of segment holograms 108 at regular intervals, the visual point position which was changed by every predetermined angle within a range from 0.3° to 1° as an observing direction is set in the horizontal and vertical directions while setting the center of the hologram forming surface 34 into a start point, and the 2-dimensional image data of each zone can be also calculated at every visual point position.

(Calculation of phase distribution)

The principle of a hologram will be first described. One laser beam is divided into two beams. One of the laser beams is irradiated onto an object and a laser beam (object light) is scattered from the object. A hologram is obtained by the interference of two light fluxes of the laser beam (object light) and another laser beam (reference light). When assuming that a wave front of the reference light is set to $R.\exp(j\phi_r)$ and a wave front of the object light is set to $O.\exp(j\phi_o)$, an exposing intensity $I_H$ of the hologram is $$I_H = R^2 + O^2 + 2.R.O.\cos(\phi_o - \phi_r) \qquad (1)$$

In case of developing the hologram, changes in amplitude and phase which are proportional to the exposing intensity $I_H$ of the equation (1) occur in the hologram. To electrically form the hologram, it is sufficient to use a space light modulating device such as a liquid crystal device or the like which can change the amplitude or phase of the light. By inputting the same wave front as that of the reference light to the hologram formed as mentioned above, a hologram can be reconstructed. Since only the third term of the right side contributes the reproduction of the object light in the exposing intensity $I_H$ of the equation (1), when considering with respect to the third term of the right side, a transmission light T from the hologram is $$\begin{aligned} T &= I_H \cdot R \cdot \exp(j\phi_r) \qquad (2) \\ &\propto 2 \cdot R \cdot O \cdot \cos(\phi_o - \phi_r) \cdot \exp(j\phi_r) \\ &= O \cdot \exp(j\phi_r) + O \cdot \exp(-j(\phi_o - 2 \cdot \phi_r)) \end{aligned}$$

The first term of the right side of the equation (2) shows that the wave front from the object was reproduced and the second term of the right side shows a conjugate wave of the object light. From the above principle description, in the calculation of the phase distribution of the hologram, it is sufficient to calculate only the third term of the right side of the equation (1).

Figure 11:
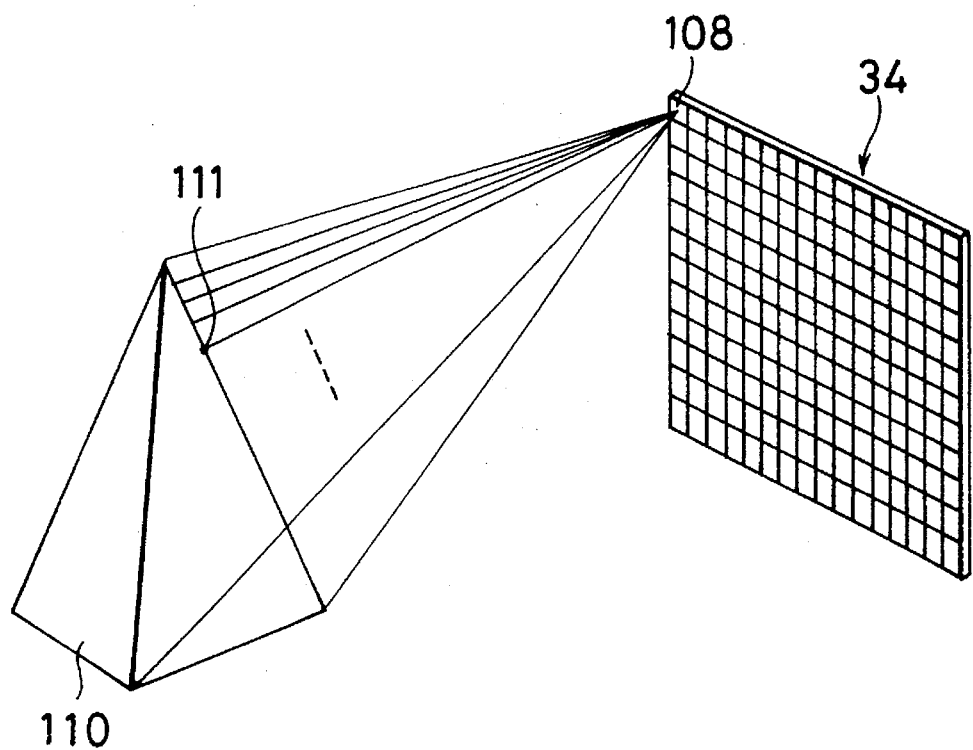
FIG. 11 is an explanatory diagram showing the principle of the phase distribution calculation to form a Fresnel type hologram.

FIG. 11 shows the forming principle of a Fresnel type hologram. Now, when the reference light is considered as a plane wave, since an intensity of the plane wave doesn't change in dependence on the location, a light intensity R can be ignored and a phase $\phi_r$ can be regarded as $\phi_r = 0$. Now, assuming that a luminance (scattering degree) of a certain sampling point 111 having coordinates $(X_i, Y_i, Z_i)$ of an object 110 is set to $I_i$, the exposing intensity $I_H$ of a certain point (segment hologram) 108 on the hologram forming surface 34 is $$I_H = \sum_i \{(I_i/r) \cdot \cos(k \cdot r)\} \qquad (3)$$

where, k denotes the number of waves of the laser beam $$r = \sqrt{\{(X_i - X_{hi})^2 + (Y_i - Y_{hi})^2 + Z_i^2\}} \qquad (4)$$

Figure 12:
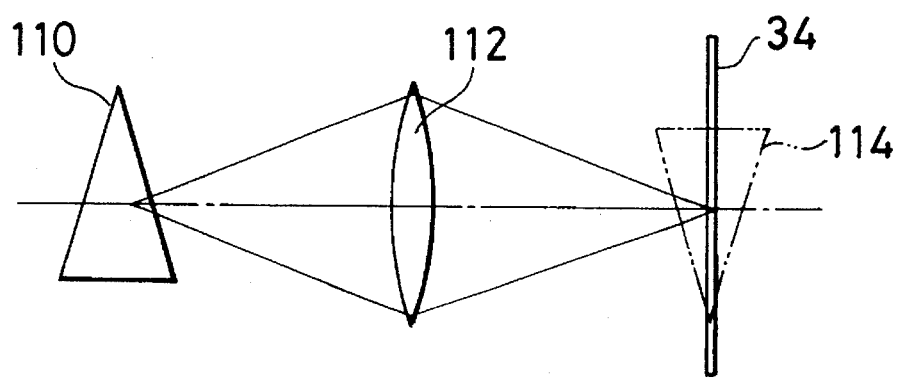
FIG. 12 is an explanatory diagram showing the forming principle of an image type hologram.
Figure 13:
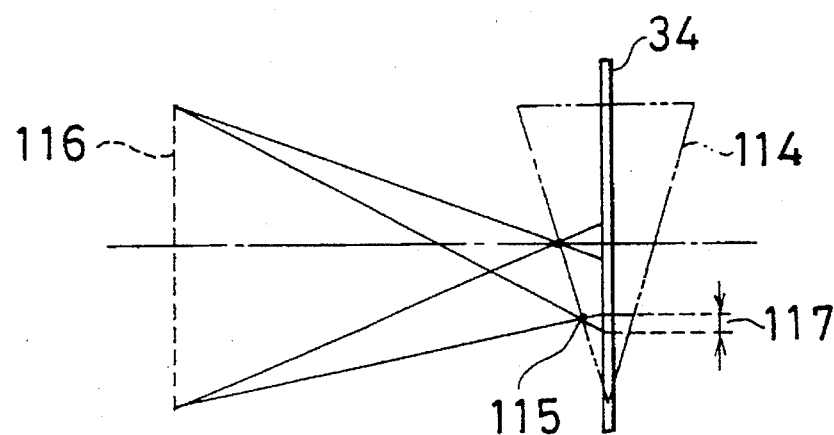
FIG. 13 is an explanatory diagram showing a calculating range of a phase distribution in the formation of an image type hologram.

FIG. 11 shows the principle of the phase distribution calculation with respect to a Fresnel type hologram as an example. Since the light reflected from the object 110 reaches the whole hologram, it is necessary to execute the calculations of the equations (3) and (4) for the whole region of the hologram forming surface 34. On the other hand, in case of an image type hologram shown in FIG. 12, the image of the object 110 is formed as a real image 114 at the position of the hologram forming surface 34 by an image forming lens 112. Therefore, as shown in FIG. 13, when considering, for example, a sampling point 115 of the image 114, the light reaches a region 117 of the hologram forming surface 34 which is determined by a virtual opening 116. The region to calculate the equations (3) and (4) is limited and the calculations are simplified by an amount of such a limitation.

According to the invention, in the calculations of the equations (3) and (4), for example, with respect to the central segment hologram 108 of the hologram forming surface, each 2-dimensional pixel of each 2-dimensional image data obtained from the sphere 36, triangular cone 38, and cylindrical body 40 which were divided every three objects is set to a sampling point and the equations (3) and (4) are calculated and exposing intensities $(I_{Hi})_1$, $(I_{Hi})_2$, and $(I_{Hi})_3$ on the hologram are obtained for every object. A phase distribution of one segment hologram 108 is calculated as a sum of the exposing intensities on the hologram obtained for every object. It can be expressed by the following general equation with respect to the numbers 1 to n of each object.

$$I_{Hi}=(I_{Hi})_1+(I_{Hi})_2+\ldots+(I_{Hi})_n \quad (5)$$

(Adjustment of size of solid image to be displayed)

Figure 14:
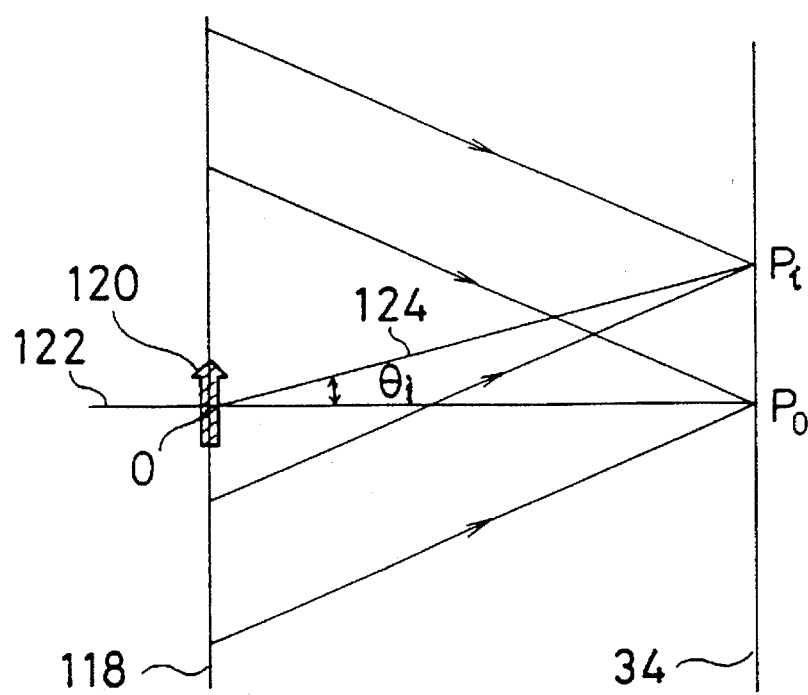
FIG. 14 is an explanatory diagram showing the optical relation between the 2-dimensional image display surface to calculate a phase distribution for enlargedly displaying a solid image and the hologram forming surface.

The size of solid image which is displayed can be changed as follows according to the invention. FIG. 14 shows the hologram forming surface 34 and a 2-dimensional image display surface 118 which are arranged so as to be away from each other by a predetermined distance. An image 120 is displayed on the 2-dimensional image display surface 118. The image 120 is shown as an upward arrow for simplicity of explanation. A crossing point $P_o$ of a center line 122 in the Z-axis direction which has ben set to the 2-dimensional image display surface 118 and passes through an origin O is set to $P_o$ on the hologram forming surface 34. The $P_o$ point constructs one segment hologram. A point $P_i$ comprising another segment hologram exists on the upper side of the $P_o$ point. A phase distribution at the $P_o$ point is obtained from all of the sampling points of the image 120 on the basis of the equations (3) and (4). Similarly, with respect to the $P_i$ point, a phase distribution can be obtained from all of the sampling points of the image 120. An observing states of the image 120 at the $P_o$ and $P_i$ points are different by only a parallax amount. When the 2-dimensional image of the 2-dimensional image display surface 118 is fetched at each of the different $P_o$ and $P_i$ points on the hologram forming surface 34, the origin O is located at the position that is away from the center by only an angle $\theta_i$ at the $P_i$ point. In the case where the operator wants to enlarge the image 120, it is enlarged on the 2-dimensional image display surface 118 around the origin O as a center and it is sufficient to calculate the phases at the $P_o$ and $P_i$ points on the basis of the result of the enlargement.

Figure 15:
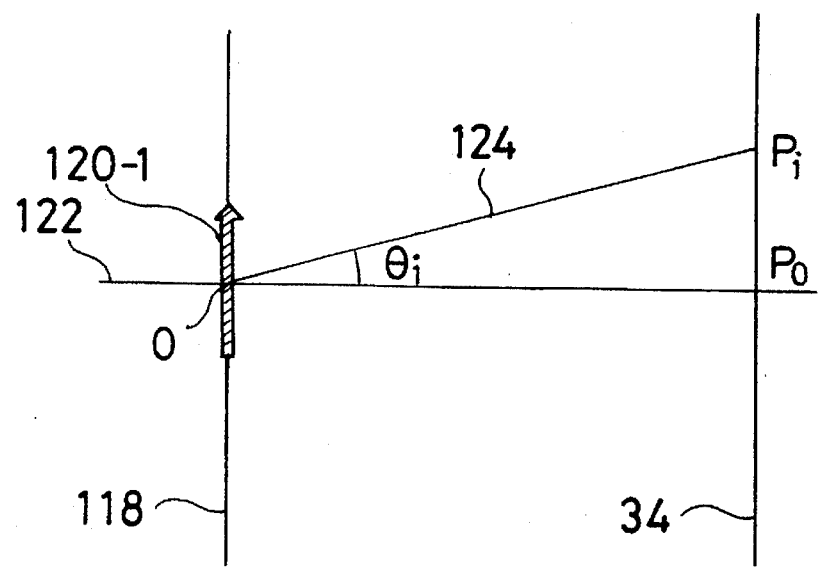
FIG. 15 is an explanatory diagram of a state in which an image is enlarged twice as large as the image of FIG. 14.

FIG. 15 shows a state of an image 120-1 which is obtained by enlarging twice the image 120 in FIG. 14. In this case as well, an angle when the origin O is seen from the $P_o$ and $P_i$ points is equal to $\theta_i$ and is not changed. No contradiction occurs in the continuity of the parallax of the image seen from the $P_o$ point and the image seen from the $P_i$ point. It is desirable that the origin O of the image 120 is set to a sharp edge portion on the object which can be always seen at the same position even when the visual point position is changed on the hologram forming surface 34.

(Adjustment of distance of solid image which is displayed)

Figure 16:
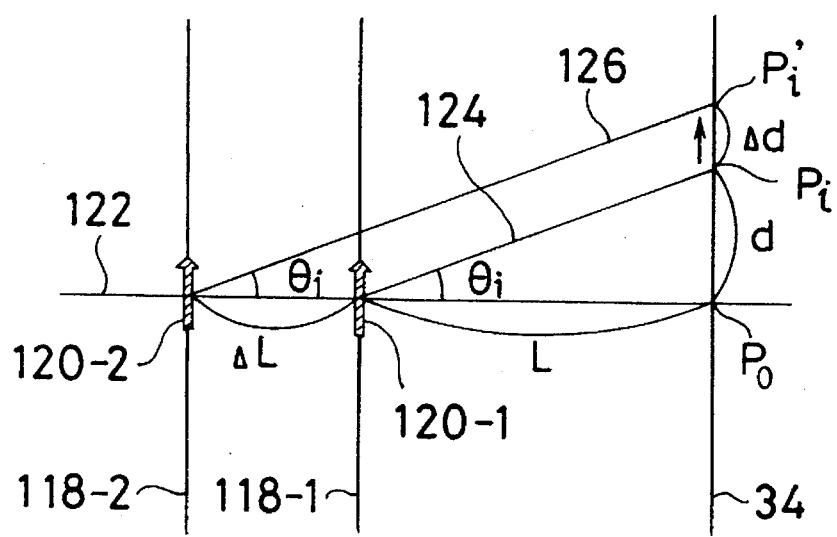
FIG. 16 is an explanatory diagram showing the optical relation between the 2-dimensional image display surface to move the display position of a solid image and the hologram forming surface.

The distance of a solid image which is displayed can be changed by the following method. FIG. 16 shows the relation when the distance of the image display surface to display the image is changed for the hologram forming surface 34. First, it is now assumed that the image 120-1 of an image display surface 118-1 locating at a position which is away from the hologram forming surface 34 by a distance L in the 2-dimensional direction was fetched at the different $P_o$ and $P_i$ points on the hologram forming surface 34. In this case, at the $P_i$ point, the origin O of the image 120-1 is located at the position that is away from the center by only an angle $\theta_i$. In case of moving the 2-dimensional image display surface 118-1 to a remote position by only $\Delta L$, the calculation point of the phase distribution is changed from $P_i$ to $P_i'$ so as to maintain the angle $\theta_i$. A shift amount $\Delta d$ of the calculation point of the phase distribution calculation in this case is $$\Delta d=(\Delta L/L)d$$

Figure 17:
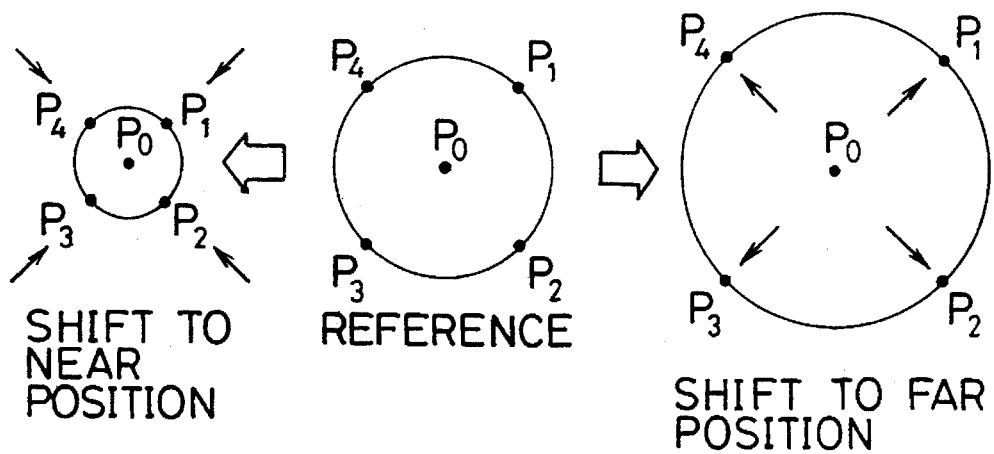
FIG. 17 is an explanatory diagram showing changes in phase distribution calculation points at the hologram forming surface in association with the movement of the image display position.

FIG. 17 shows changes in four calculation points $P_1$ to $P_4$ existing around the phase distribution calculation point (segment hologram) $P_o$ in the cases where the image display surface was moved to a remote position on the right side from the central reference position and where it was moved to a near position on the left side. That is, in the case where the image display surface was moved to a near position, the peripheral calculation points $P_1$ to $P_4$ are closely collected. In the case where the image display surface was moved to a remote position, the peripheral calculation points $P_1$ to $P_4$ are radially widened. When the display surface is moved to remote position, since the interval between the calculation points is widened, the 2-dimensional image when it is seen from the position between the adjacent calculation points is obtained by the image interpolation. A phase distribution at the interpolation calculation point is calculated from the interpolated image, thereby assuring a continuity of the reconstructed solid image in the case where the display surface was moved to a remote position.

(Display of phase distribution and display of solid image by change in optical wave front)

Figure 18:
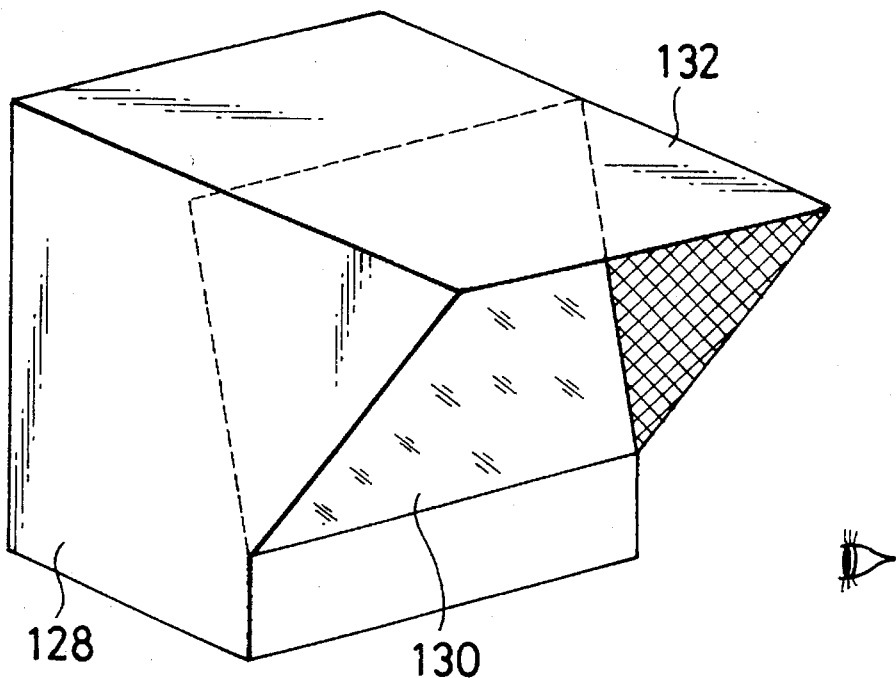
FIG. 18 is an explanatory diagram showing an embodiment of a stereoscopic display apparatus of the invention.
Figure 19:
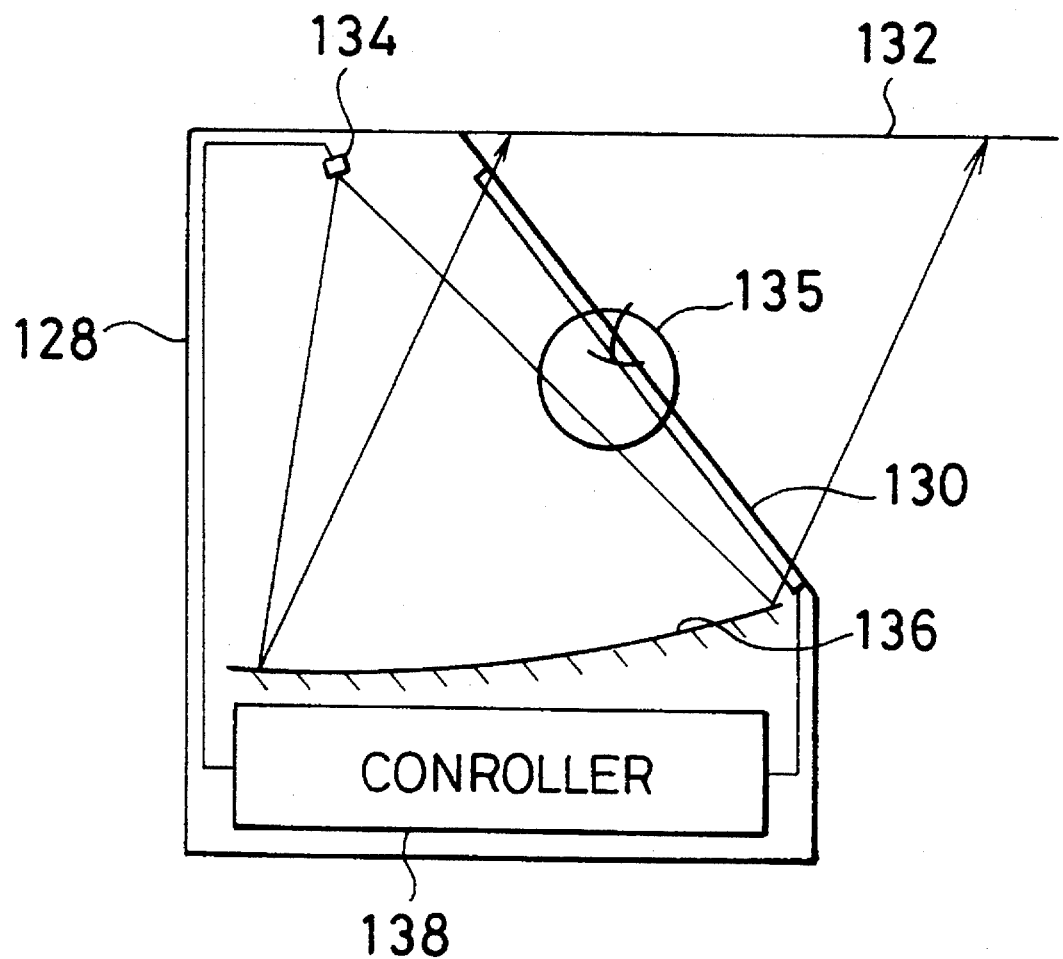
FIG. 19 is an explanatory diagram showing an internal structure of FIG. 18.

FIG. 18 shows an external view of a hologram display apparatus for displaying a solid image by expressing the phase distribution obtained by the calculation and by irradiating a reference light thereto. A space light modulating apparatus 130 to electrically form a hologram is provided in front of an apparatus main body 128. Further, a hood 132 to shield the 0th order light which transmits the space light modulating apparatus 130 is attached. FIG. 19 shows an internal structure of FIG. 18. A laser light source 134 which functions as a point light source, a collimating mirror 136, and a controller 138 are built in the apparatus main body. The controller 138 gives the phase distribution obtained by the calculation to the space light modulating apparatus 130. In this state, a spherical wave irradiated as a point light source from the laser light source 134 is converted into a parallel light by the reflecting type collimating mirror 136 and is irradiated to the space light modulating apparatus 130, thereby reconstructing a solid image 135. In this case, since a part of the parallel light directly transmits the space light modulating apparatus 130 as a 0th order light, it is shielded by the hood 132.

Although an arbitrary laser light source can be used as a laser light source 134, it is desirable to use a small semiconductor laser. The semiconductor laser has a light emission spectrum whose wavelength width is equal to or less than a few nm and can reconstruct a clear solid image. Although an arbitrary wavelength can be used so long as it lies within a visible light range, it is necessary to consider a wavelength of the light source which is used for reconstruction at the stage of calculating the phase distribution of the hologram. Specifically speaking, it is possible to use a semiconductor laser which emits the light of red color whose wavelength is on the order of 600 nm, the light of green color whose wavelength is on the order of 500 nm, or the light of blue whose wavelength is on the order of 400 nm. In case of the Fresnel type hologram, on the other hand, such that the object 110 is away from the hologram forming surface 34 as shown in FIG. 11, as the distance is large, the hologram is more easily influenced by the color distribution due to the wavelength width of the reproduction light. It is, accordingly, desirable to use a semiconductor laser of a narrow wavelength band. On the other hand, in case of the image type hologram such that a real image 114 appears near the hologram forming surface 34 as shown in FIG. 12, since the hologram is hardly influenced by the color distribution due to the wavelength width of the reproduction light, a clear reconstruction image can be obtained even when a wavelength width is slightly wide. In the image type hologram, therefore, a halogen lamp or the like having a wide wavelength width of about 10 nm can be also used. In FIG. 19, although the spherical wave is directly emitted from the laser light source 134, it is also possible to use a construction such that a laser beam is generated by using an objective lens and a pin hole or a construction such that a laser beam is transmitted in an optical fiber and is emitted upon outgoing.

Figure 20:
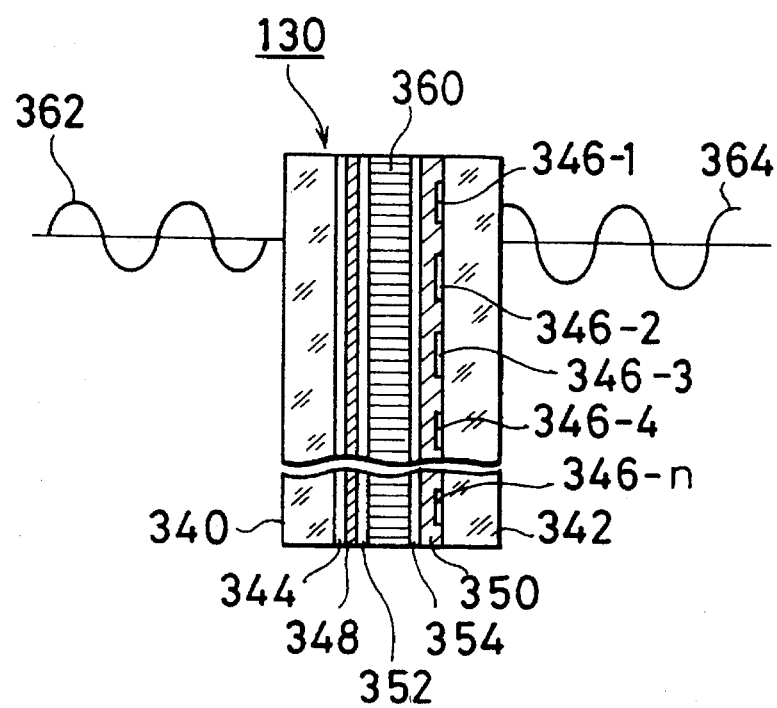
FIG. 20 is an explanatory diagram of a liquid crystal display which is used as a space light modulating apparatus in the invention.

FIG. 20 shows an embodiment of the space light modulating apparatus 130 which is used in the invention. A liquid crystal display is used as a space light modulating apparatus 130 in the embodiment. That is, a uniform transparent electrode 344 is provided subsequent to a glass substrate 340 on the incident surface side. Subsequent to a glass substrate 342 on the outgoing side, branched transparent electrodes 346-1 to 346-n constructing one display segment are formed. Subsequent to the transparent electrodes 344, 346-1 to 346-n, orientation films 352 and 354 are arranged through insulating layers 348 and 350. A liquid crystal 360 is provided between the orientation films 352 and 354. The liquid crystal display is driven so that the voltage corresponding to the calculated phase information is applied to each liquid crystal cell which is determined by each of the branched electrodes 346-1 to 346-n. The liquid crystal cell changes a refractive index for the transmitting direction of a reproduction light 362 in accordance with the applied voltage.

Figure 21:
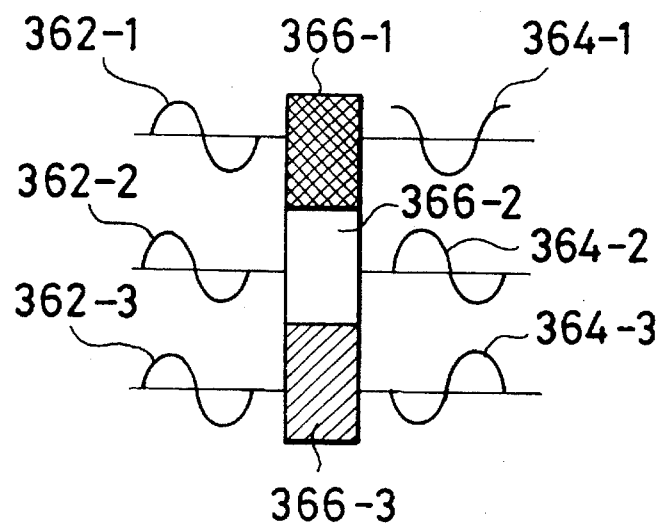
FIG. 21 is an explanatory diagram showing a phase modulation for a reproduction light with respect to three of liquid crystal cells in FIG. 20.

FIG. 21 shows a state of the phase modulation of three of the pixels of the liquid crystal displays in FIG. 20 as an example. When reproduction lights 362-1 to 362-3 comprising, for example, plane waves having the same phase are inputted from the left side into pixels 366-1 to 366-3 which were driven in different phase states, namely, different refractive indices, phase deviations occur in lights 364-1 to 364-3 upon outgoing because the optical distances in the liquid crystal differ in dependence on the pixels 366-1 to 366-3. Ideally, it is desirable that an arbitrary phase in a range from 0 to $2\pi$, namely, a range of the length corresponding to the wavelength as an optical distance can be expressed. Even when the phase is discretely expressed by multivalue levels, however, the phase distribution can be approximately expressed in a practical range. A thickness d of liquid crystal is determined so as to satisfy a condition such that the product sum $\Delta n \times d$ of the thickness d and a change $\Delta n$ in maximum refractive index which can be changed by the applied voltage is equal to a wavelength $\lambda$ of the reproduction light. In order to accurately express the phase distribution and to obtain a clear reconstructed solid image, it is necessary to reduce the size of liquid crystal cell to the order of the wavelength and to use a liquid crystal display of a high resolution.

Figure 22:
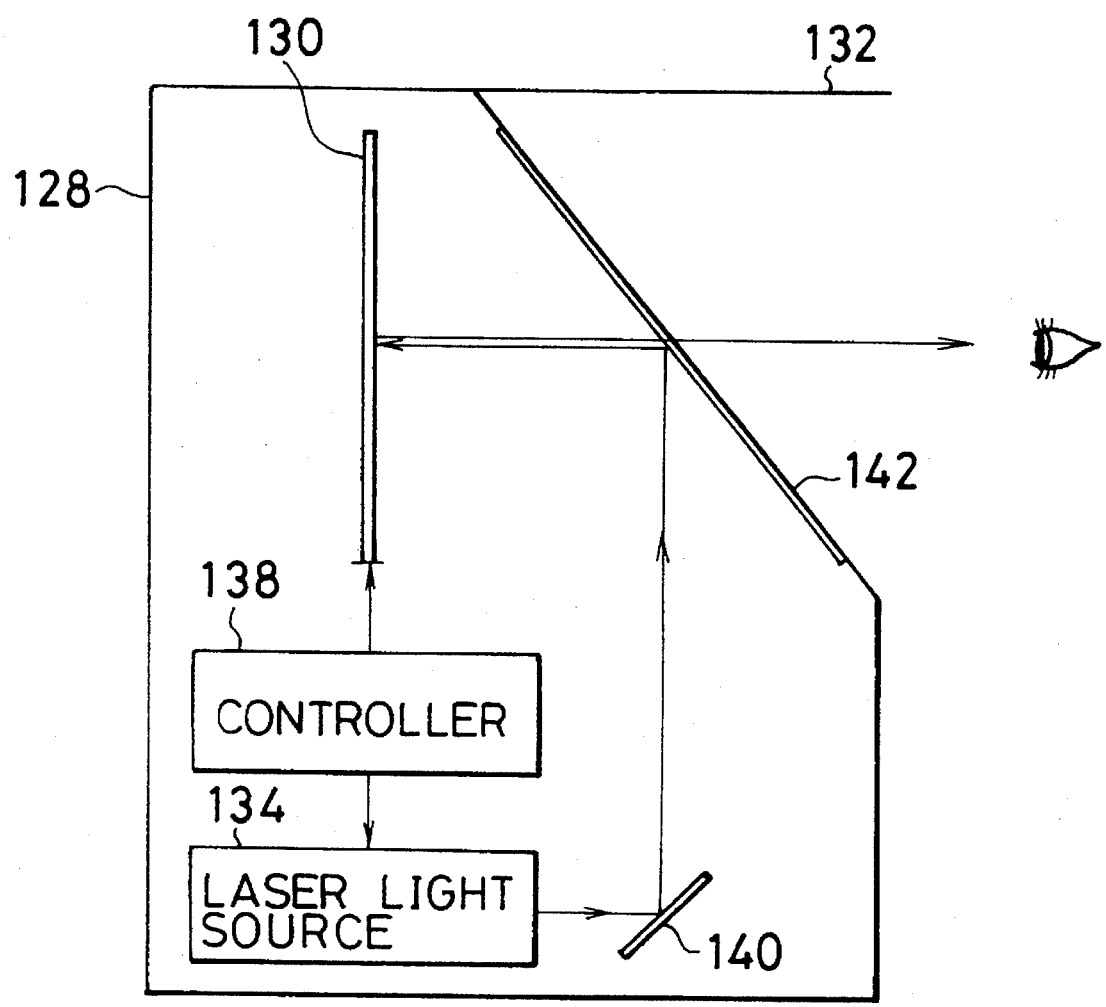
FIG. 22 is an explanatory diagram of another stereoscopic display apparatus of the invention using a reflecting type space light modulating apparatus.
Figure 23:
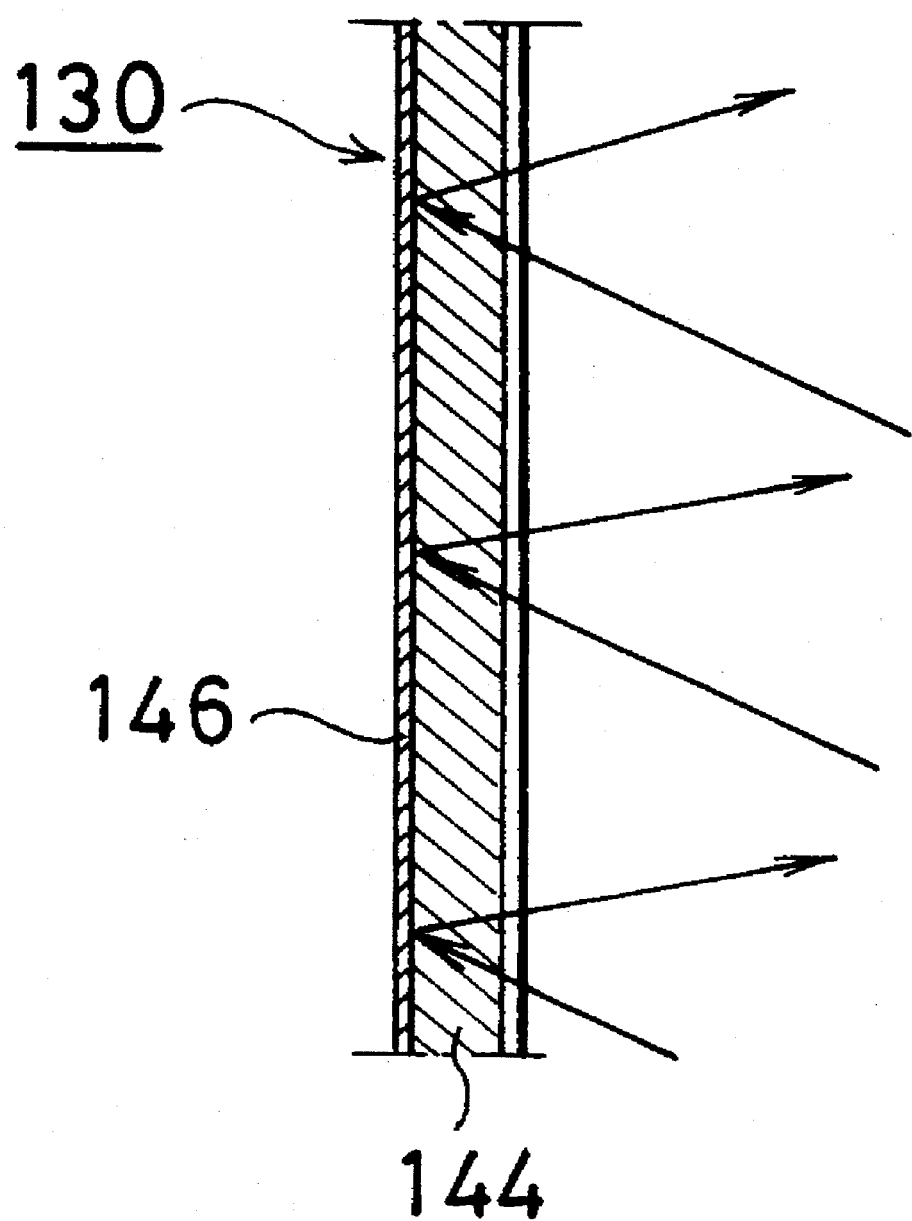
FIG. 23 is an explanatory diagram of the reflecting type space light modulating apparatus which is used in FIG. 22.

FIG. 22 shows another embodiment of a stereoscopic display apparatus of the invention and is characterized in that reflecting type space light modulating apparatus is used. The reflecting type space light modulating apparatus 130 is provided in the apparatus main body 128, thereby electronically expressing the hologram of the phase distribution calculated by the controller 138. The reproduction light from the laser light source 134 is reflected by a mirror 140 and is further reflected by a half mirror 142 and enters the reflecting type space light modulating apparatus 130. The modulation light from the modulating apparatus 130 passes through the half mirror 142 and displays a solid image. According to the reflecting type space light modulating apparatus 130, as shown in FIG. 23, the reproduction light is inputted from one side of a transmitting type liquid crystal display 144 and is reflected by a reflecting body 146 on the opposite side and is again transmitted in the liquid crystal display 144 and goes out. Since the reproduction light passes in the transmitting type liquid crystal display 144 twice as mentioned above, a thickness of liquid crystal to obtain a phase change can be reduced into ½ of that of the transmitting type liquid crystal display shown in FIG. 20. In this instance, however, a liquid crystal of homogeneous orientation in which the polarization is preserved is used.

Figure 24:
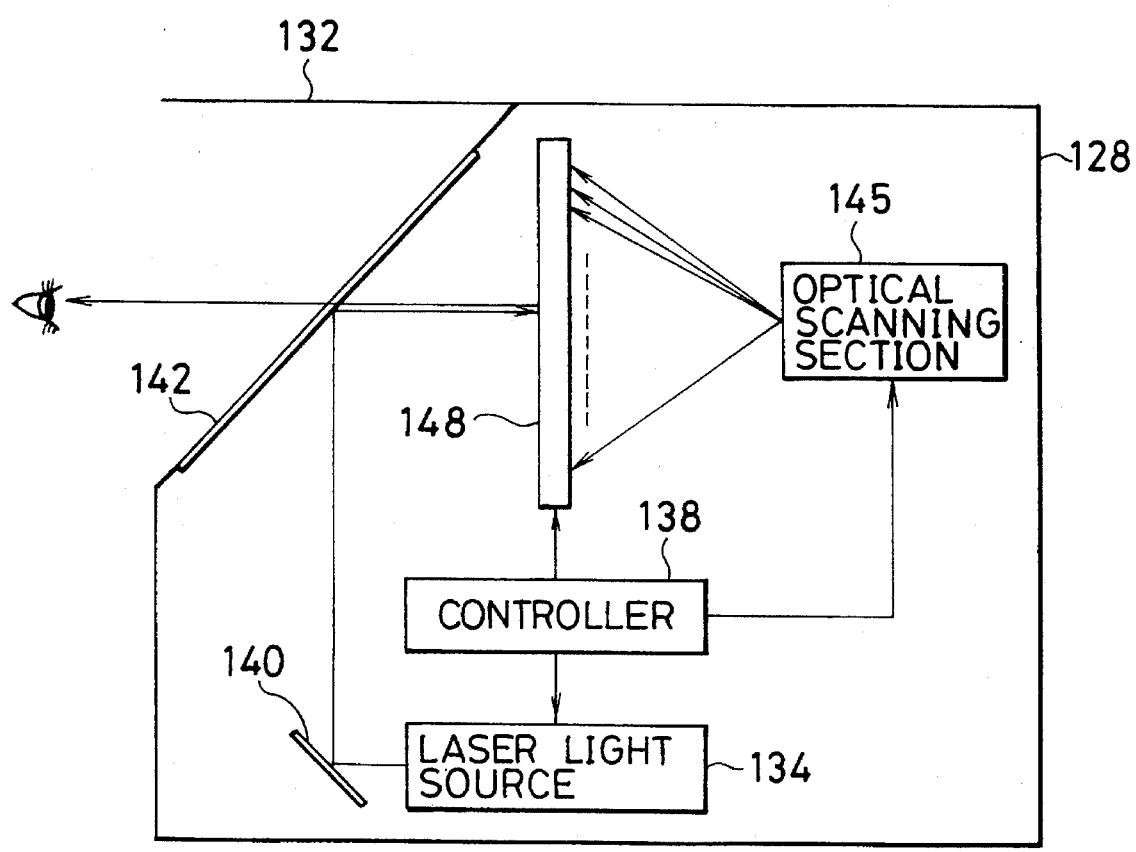
FIG. 24 is an explanatory diagram of a stereoscopic display apparatus of the invention using a space light modulating apparatus of the light writing type.

FIG. 24 shows another embodiment of a stereoscopic display apparatus of the invention and is characterized in that the information of the calculated phase distribution is optically written and reproduced. A space light modulating apparatus 148 into which phase distribution information can be optically written by a laser beam from an optical scanning section 145 is provided in the apparatus main body 128. When the phase distribution information is written into the space light modulating apparatus 148 by the laser beam from the optical scanning section 145, the controller 138 controls the space light modulating apparatus 148 into the same state as that of the reflecting type liquid crystal display shown in FIG. 23. Therefore, the laser beam from the laser light source 134 is reflected by the mirror 140 and the half mirror 42 and enters as a reproduction light and a stereoscopic image is displayed through the half mirror 142.

Figure 25:
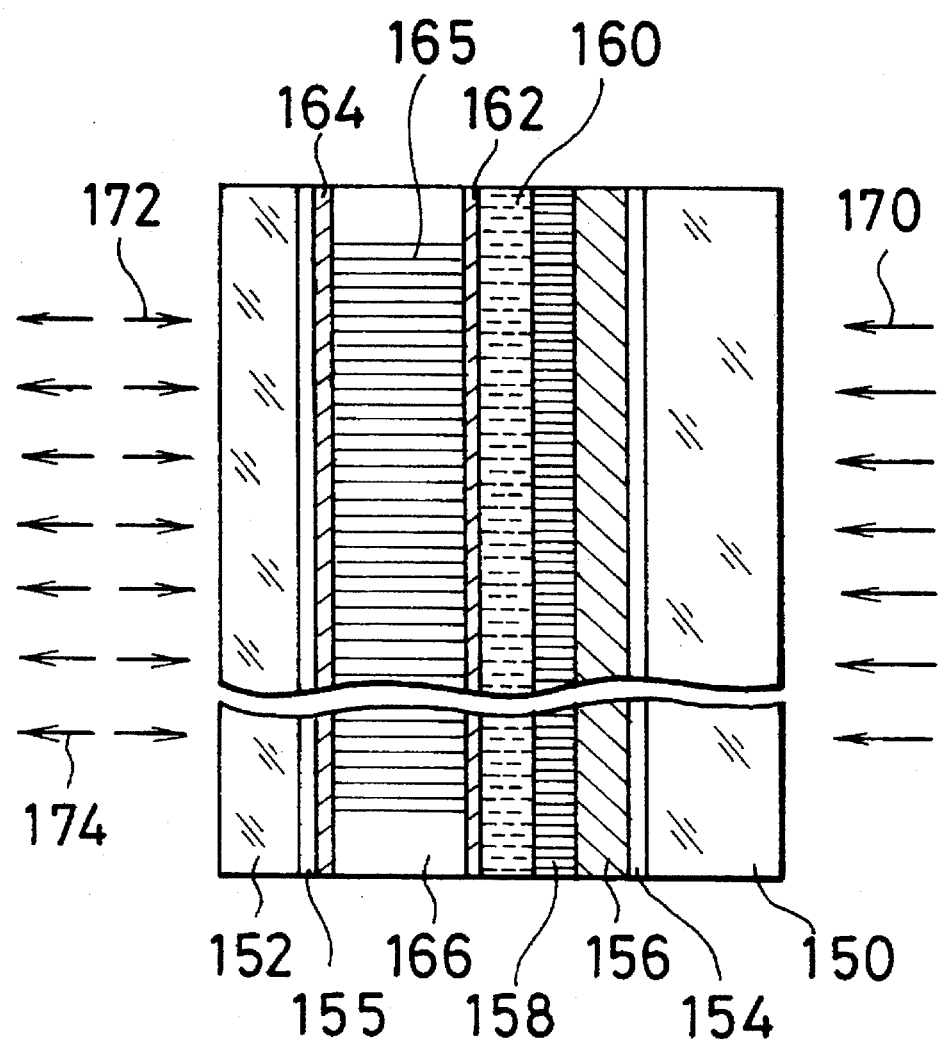
FIG. 25 is an explanatory diagram of the light writing type space light modulating apparatus which is used in FIG. 24.

FIG. 25 shows a cross sectional structure of a space light modulating apparatus into which information can be optically written and which is used in FIG. 24. A transparent electrode 154, a photoconductive section 156, and a light shielding layer 158 are provided subsequent to a glass substrate 150 on the incident side of a writing light 170. Subsequent to the light shielding layer 158, a dielectric mirror 160 is provided. A glass substrate 152 is provided on the left side into which a reproduction light 172 enters. Subsequently, a transparent electrode 155 is provided. A liquid crystal 165 is arranged between the transparent electrode 155 and the dielectric mirror 160 through the insulating layers 164 and 162.

In the operation of the space light modulating apparatus 148, when the writing light 170 is first received by the photoconductive section 156, a resistance value of the photoconductive section decreases as the light intensity is large. When the resistance value of the photoconductive section 156 changes, the resistance value of the photoconductive section 156 changes although the driving voltage is constant. Therefore, the voltage which is applied across the liquid crystal 165 through the dielectric mirror 160 is changed by only an amount corresponding to the resistance value. When the voltage which is applied to the liquid crystal 165 changes as mentioned above, a refractive index changes.

When the incident reproduction light 172 is reflected by the dielectric mirror 160 and is returned, it becomes a modulation light 174 which was phase modulated.

Figure 26:
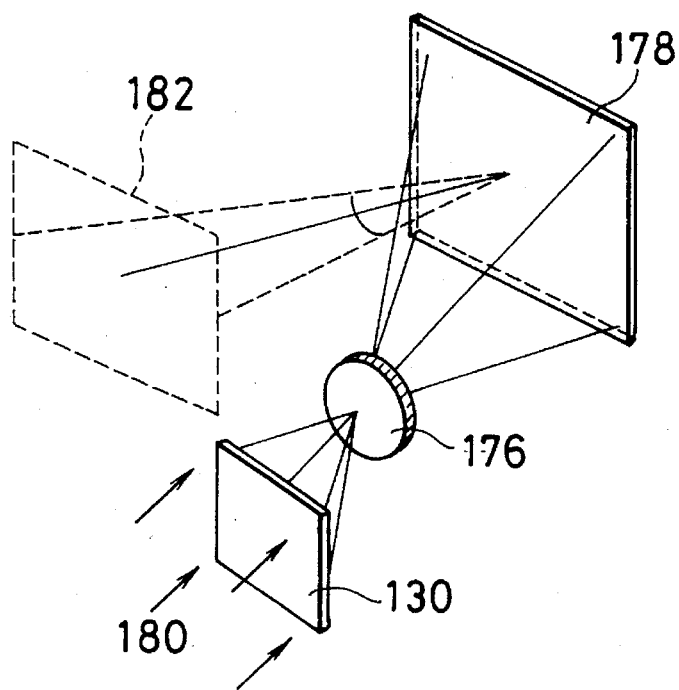
FIG. 26 is an explanatory diagram of a stereoscopic display apparatus of the invention using an enlarging screen.

FIG. 26 shows another embodiment of a stereoscopic display apparatus of the invention. According to this embodiment, a reproduction light 180 enters the space light modulating apparatus 130 using a transmitting type liquid crystal display or the like which expresses the calculated phase distribution and is modulated. After that, the modulated light is enlarged by a projection optical system 176 and is projected to a hologram screen 178. Therefore, a solid image can be seen in a visible range 182 of an angle of visibility θ.

Figure 27:
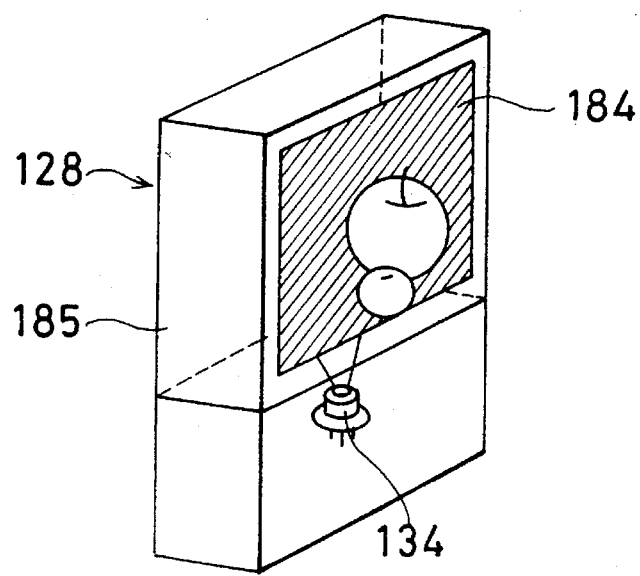
FIG. 27 is an explanatory diagram of a stereoscopic display apparatus of the invention using a space light modulating apparatus which is integrated with a refractive body for preventing the transmission of the 0th order light.
Figure 28:
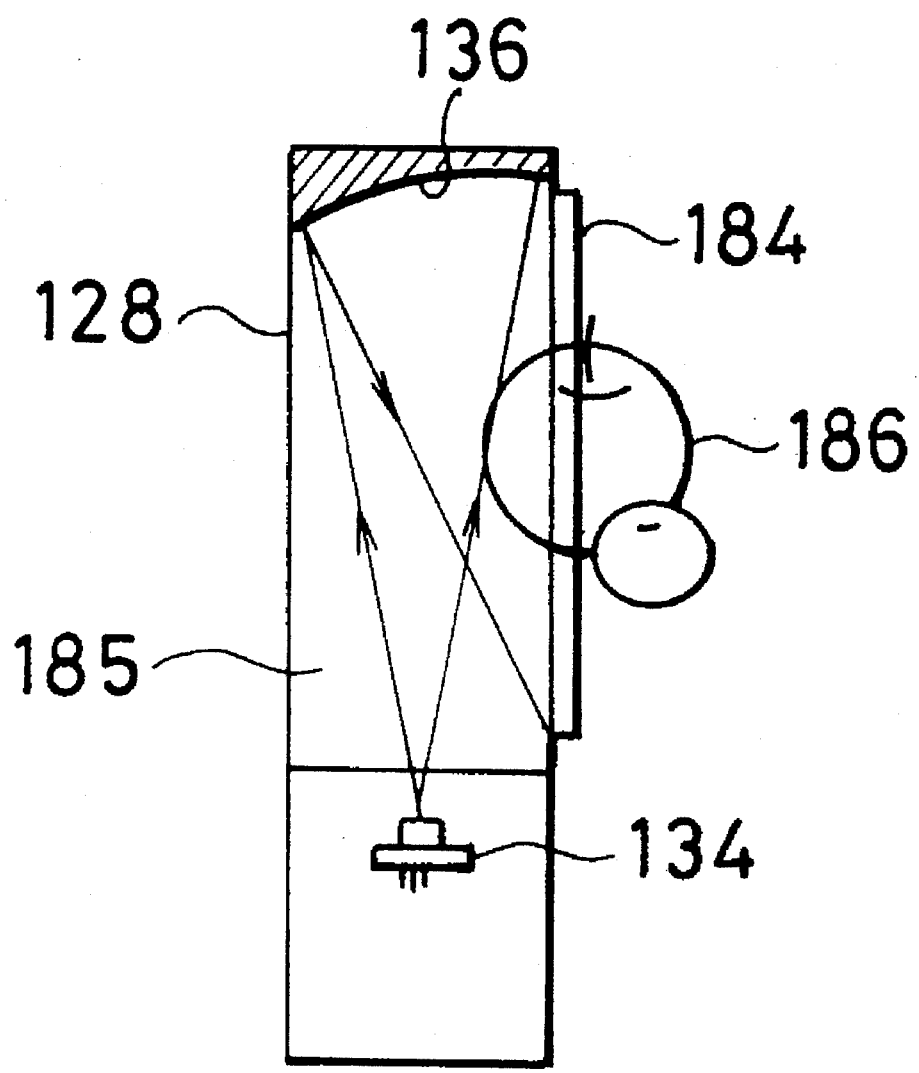
FIG. 28 is an explanatory diagram of an internal structure of the apparatus of FIG. 27.

FIG. 27 shows another embodiment of a stereoscopic display apparatus of the invention and is characterized in that the hood to prevent the 0th order light is made unnecessary. Namely, in the embodiment of FIG. 27, a space light modulating apparatus 184 integrated with a refracting body 185 to suppress the emission of the 0th order light is provided in the apparatus main body 128. As shown in FIG. 28, therefore, a spherical wave from the laser light source 134 is led into the refracting body 185 and is reflected by the collimating mirror 136 and is inputted into the space light modulating apparatus 184 integrated with the refracting body 185 at an incident angle that is equal to or larger than the critical angle. Due to this, the 0th order light is totally reflected and it is prevented that the 0th order light emits out of the apparatus. Therefore, there is no need to use the hood to prevent the 0th order light.

(Color stereoscopic display apparatus)

Figure 29:
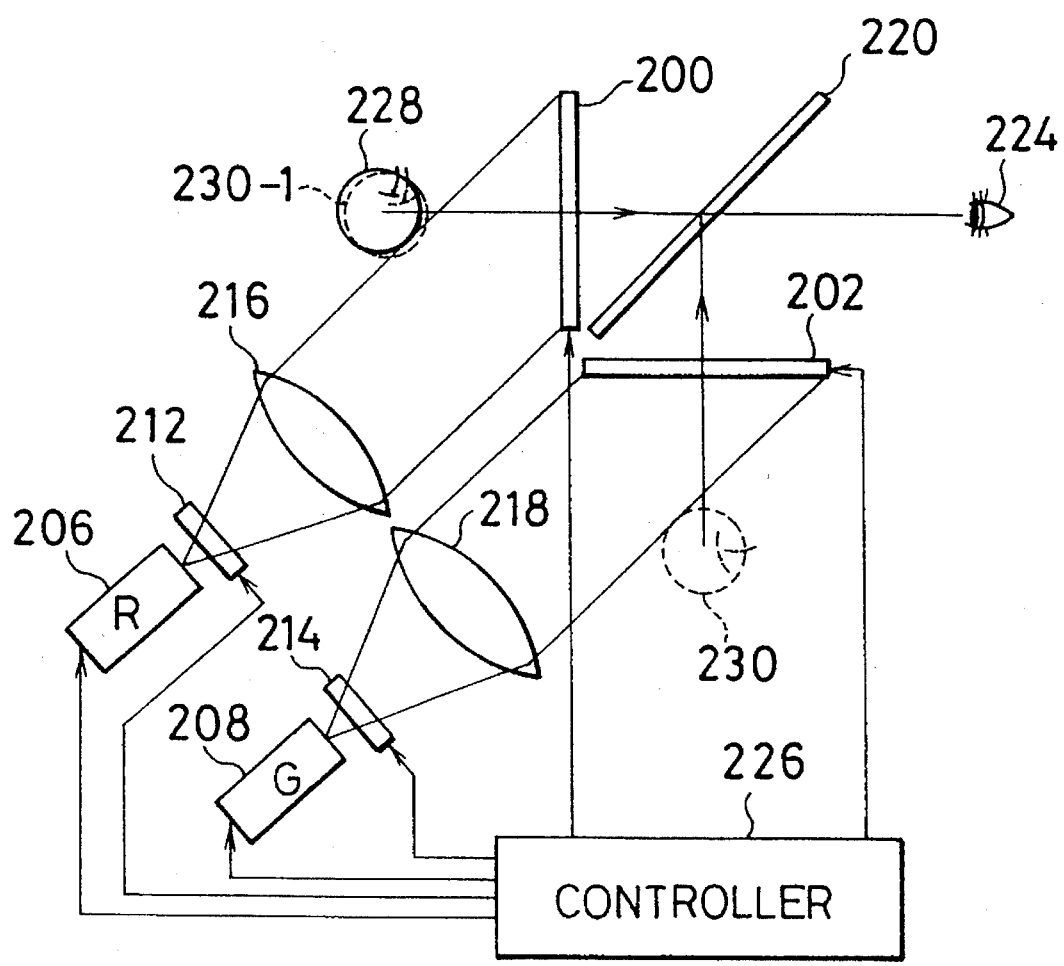
FIG. 29 is an explanatory diagram of a stereoscopic display apparatus of the invention for performing a color stereoscopic display by using two components of R and G.

In case of displaying a color solid image according to the invention, the formation of the 3-dimensional information in step S1, the formation of the 2-dimensional images for every figure structure in step S2, and the calculation of the phase distribution in step S3 shown in FIG. 1 are executed, for example, for every color component of R, G, and B. FIG. 29 shows an embodiment of a color stereoscopic display apparatus for performing a multicolor display by using two stereoscopic display apparatuses. A space light modulating apparatus 200 is driven by a controller 226 in accordance with the phase distribution calculated with respect to, for example, the R component. A space light modulating apparatus 202 is driven in accordance with the phase distribution calculated with respect to the G component. Reproduction lights are irradiated to the space light modulating apparatuses 200 and 202 by laser light sources 206 and 208, shutters 212 and 214, and collimating lenses 216 and 218, thereby displaying an R component solid image 228 and a G component solid image 230. Due to this, the G component solid image 230 is reflected by a half mirror 220 and can be seen by the eyes 224 of the observer. The R component solid image 228, on the other hand, passes through the half mirror 220 and enters the eyes 224. Consequently, the observer can see a synthesized color solid image in which the G component solid image 230 was overlapped on the R component solid image 228.

Figure 30:
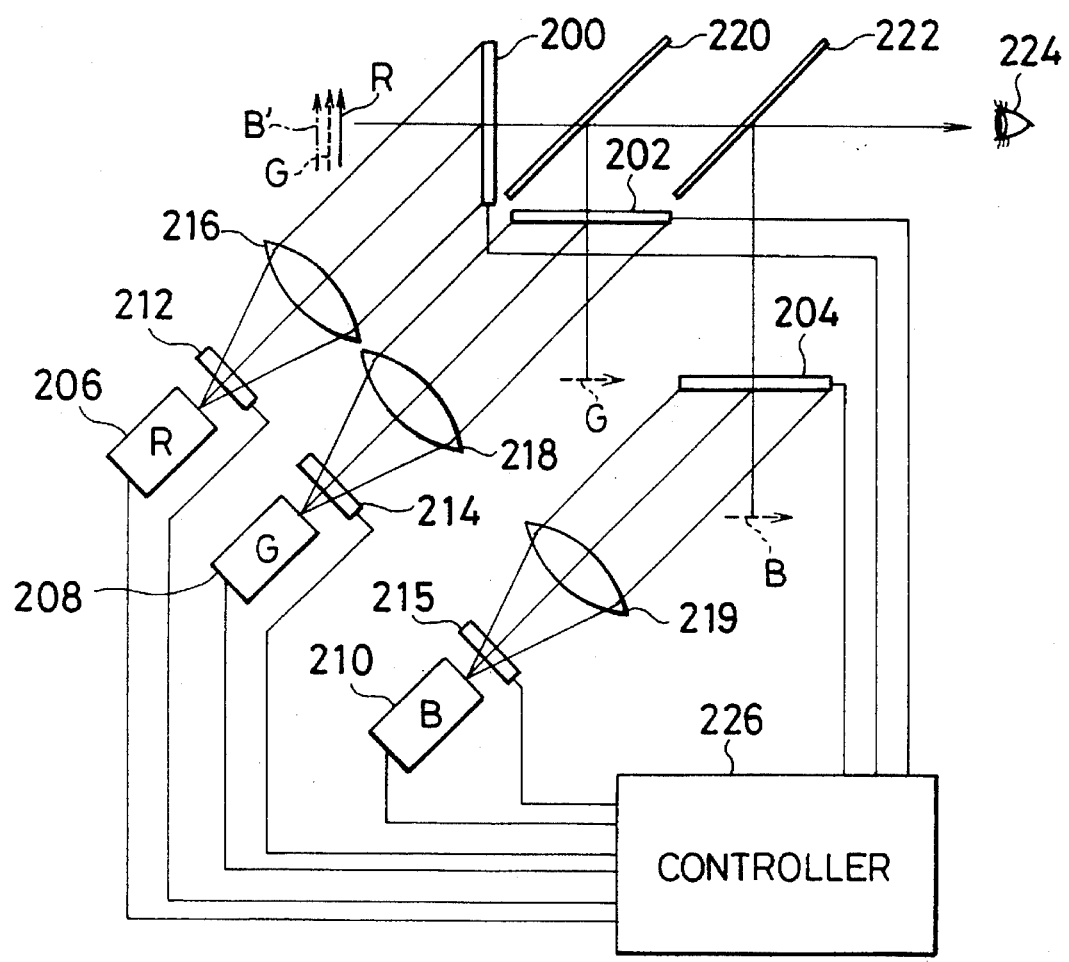
FIG. 30 is an explanatory diagram of a stereoscopic display apparatus of the invention for performing a color stereoscopic display by using three components of R,G, and B.

FIG. 30 shows another embodiment of a color stereoscopic display apparatus of the invention and is characterized in that a phase distribution is calculated every R, G, and B components and a synthetic color display is performed. Namely, according to the embodiment of FIG. 30, in addition to the embodiment of FIG. 29, a laser light source 210, a shutter 215, and a collimating lens 219 are provided as a display system of the B component. A space light modulating apparatus 204 which is driven in accordance with the phase distribution calculated with respect to the B component is provided. Further, a half mirror 222 is added in correspondence to the space light modulating apparatus 204. Therefore, a color synthetic solid image of the R, G, and B components shown by arrows can be seen by the eyes 224 of the observer.

Figure 31:
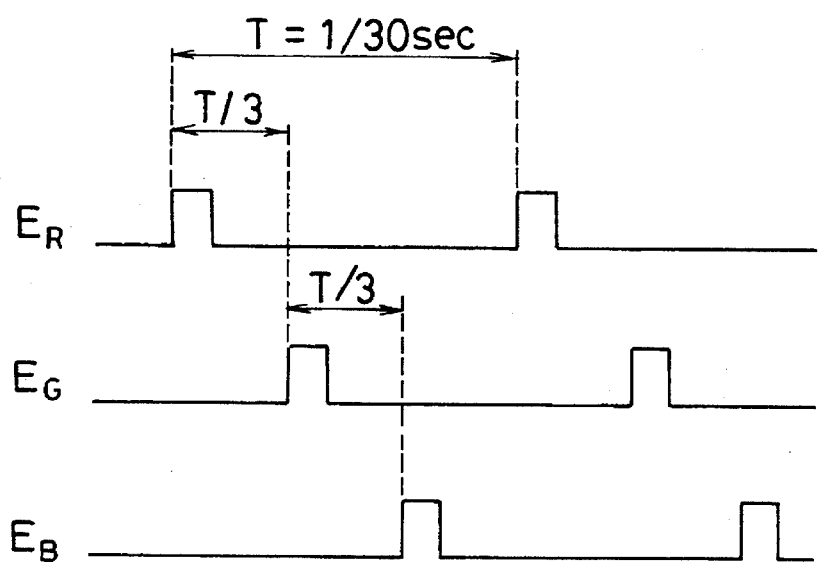
FIG. 31 is a timing chart for time-divisionally synthesizing and displaying the color components in FIG. 30.

A timing chart of FIG. 31 show driving signals $E_R$, $E_G$, and $E_B$ for the time-divisional display of the RGB components by the opening/closing driving operations of the shutters 212, 214 and 215 by the controller 226 in FIG. 30. The driving signals $E_R$, $E_G$, and $E_B$ are repetitively generated at a period T=1/30 second and each signal is driven so as to have a timing delay of (T/3). In case of two components of R and G in FIG. 29, a timing deviation between the two signals $E_R$ and $E_G$ is set to (T/2).

Figure 32:
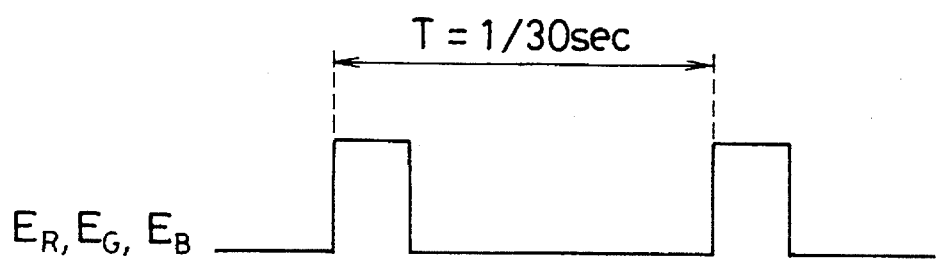
FIG. 32 is a timing chart for position dividing the color components in FIG. 30 to the same time and for synthesizing and displaying the divided components.

A timing chart of FIG. 32 shows another driving method in FIGS. 29 and 30. In the embodiment, the shutters are opened at the same time at the period T=1/30 (second) and the solid images of two or three color components are simultaneously displayed at different positions, thereby color synthesizing the displayed solid images.

(Method of forming hologram by exposure)

Figure 33:
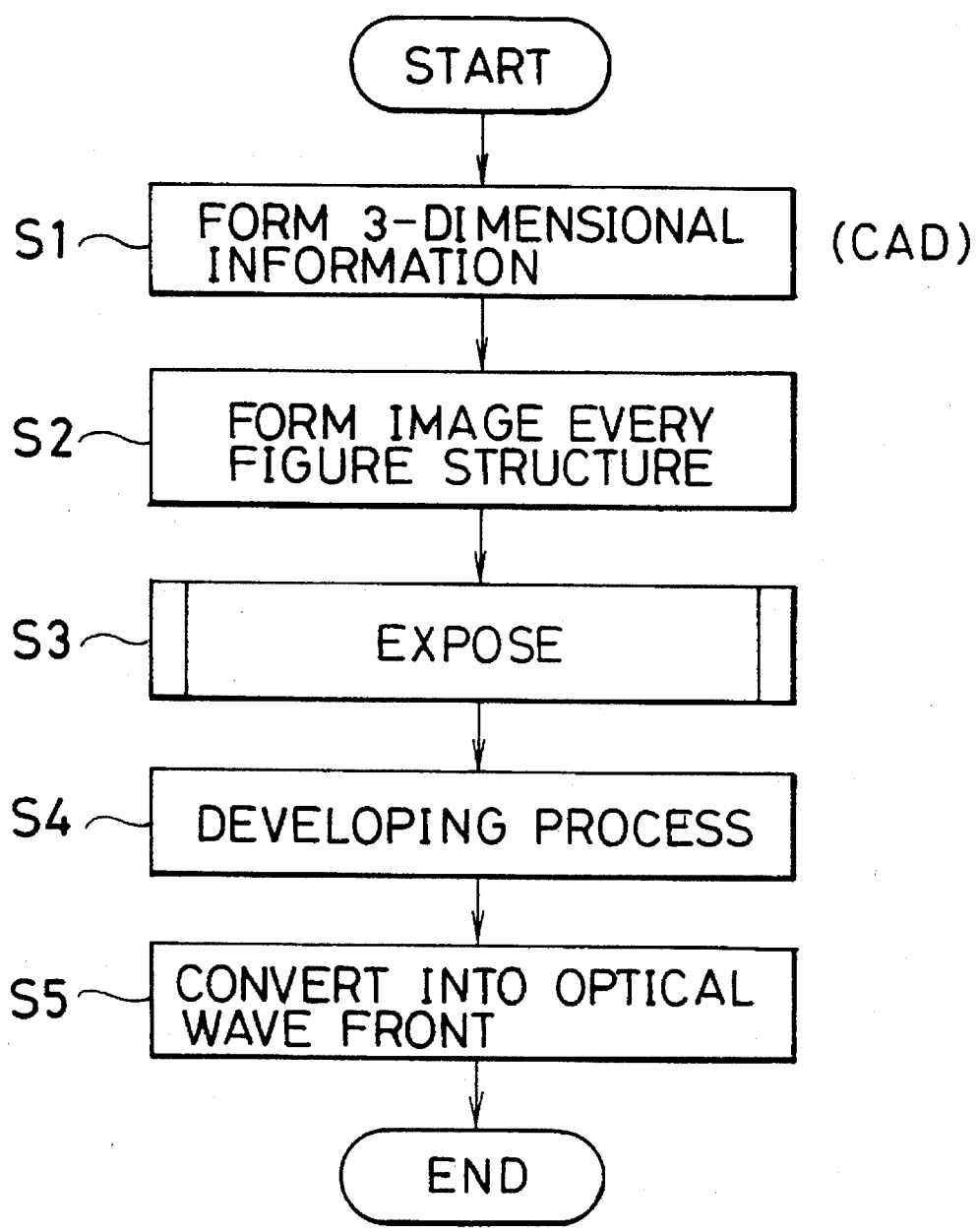
FIG. 33 is a flowchart showing a fundamental processing procedure for a hologram forming method in the invention.

A flowchart of FIG. 33 shows a hologram forming method of forming a hologram by exposing a hologram dry plate or the like according to the invention. In the hologram forming method, the formation of the 3-dimensional information in step S1 and the formation of the 2-dimensional images for every figure structure in step S2 are fundamentally the same as those in the stereoscopic display method of the hologram shown in FIG. 1 except a different point that no phase distribution is calculated. In the formation of the 2-dimensional images in step S2, in place of calculating the phase distribution, 2-dimensional data in case of observing each figure structure from a plurality of segment hologram regions of the hologram forming surface is directly used and the exposure in step S3 is performed. In the exposure in step S3, the corresponding 2-dimensional image is displayed on the liquid crystal display or the like at every hologram forming position and the multiple exposure for each zone is executed by an interference of two light fluxes of the 2-dimensional image light which is formed by irradiating the light and the reference light. After completion of the exposure to the hologram dry plate as a recording medium as mentioned above, a developing process is executed in step S4. The hologram formed finally is set to the stereoscopic display apparatus, a reference light is irradiated, and the reference light is converted into the optical wave front in accordance with the phase distribution of the exposed hologram, thereby displaying a solid image.

Figure 34:
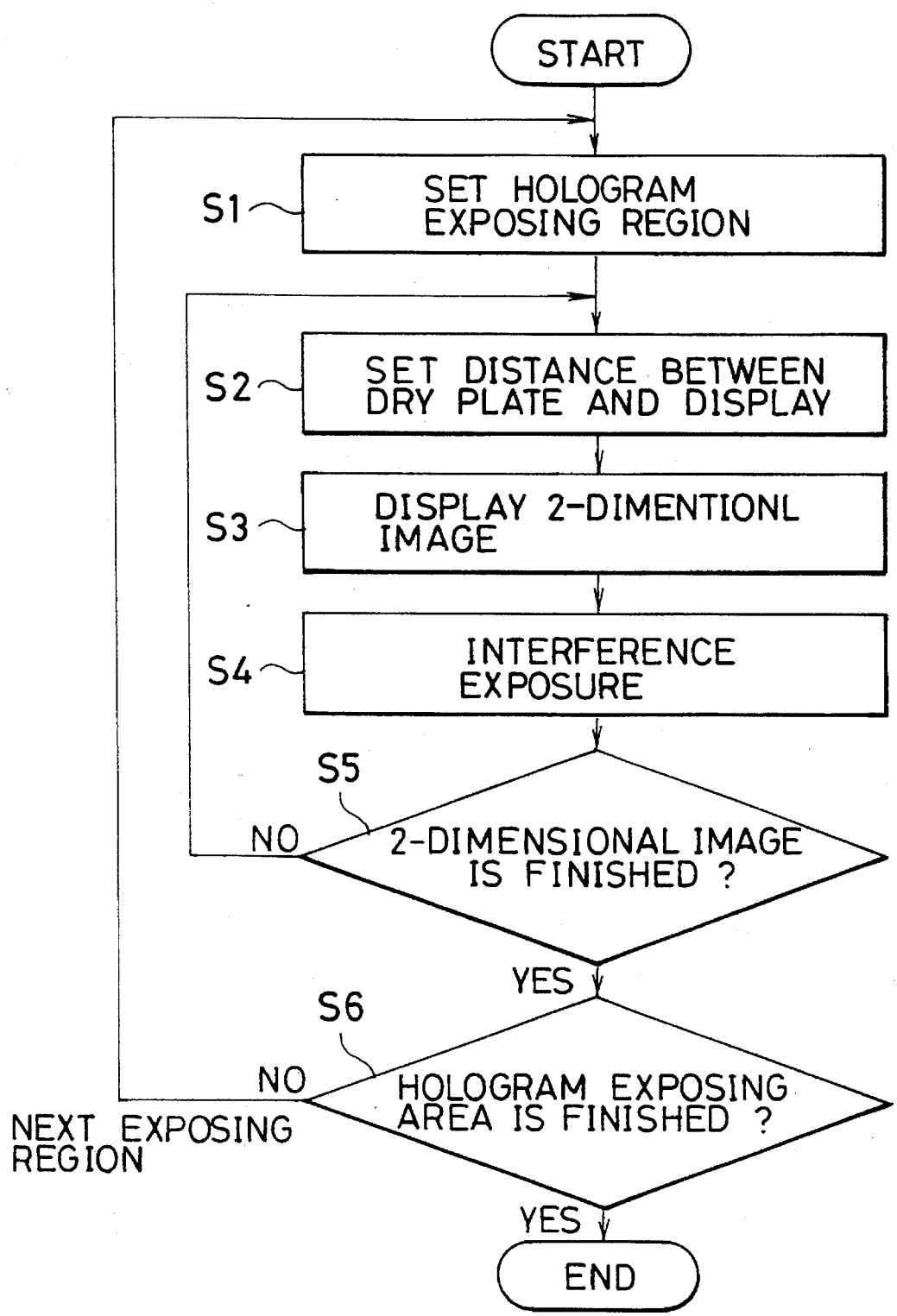
FIG. 34 is a flowchart showing the details of an exposing step in FIG. 33.
Figure 35:
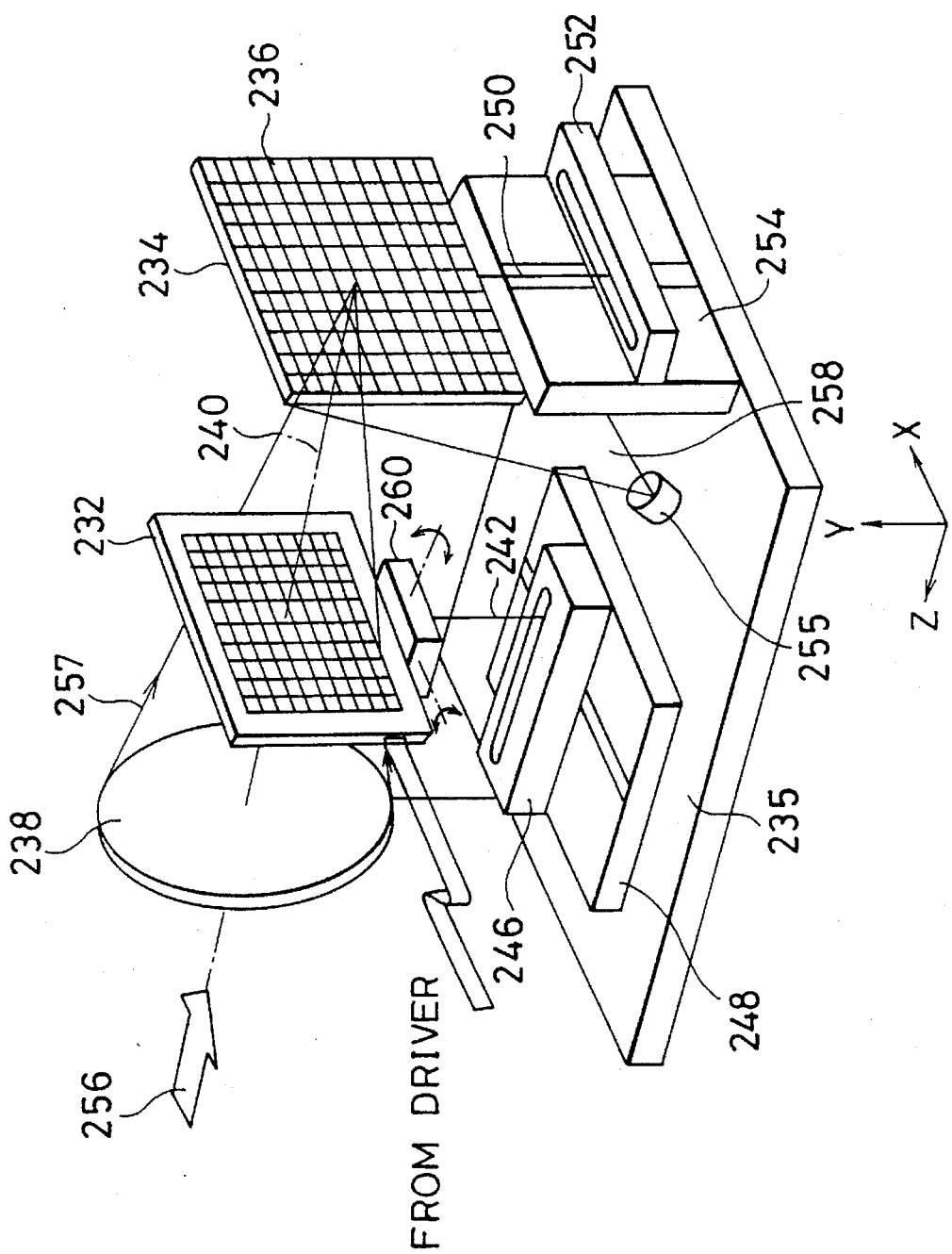
FIG. 35 is an explanatory diagram showing a construction of an exposing apparatus which is used in the exposing step of FIG. 34.

A flowchart of FIG. 34 shows the details of the exposing process shown in step S3 in FIG. 33. For example, an exposing apparatus as shown in FIG. 35 is used in the exposing process. An image forming lens 238, a liquid crystal display 232, and a hologram dry plate 234 are provided in the apparatus of FIG. 35. The liquid crystal display 232 is supported to a rotary stage 260 disposed on a supporting arm 242 and can be moved in the Z and X directions by a Z stage 246 and an X stage 248 on a base plate 235. The display 232 can be also rotated around an X axis and a Z axis by the rotary stage 260. The display surface of the liquid crystal display 232, consequently, can be controlled to an arbitrary 3-dimensional position. In place of the rotary stage 260, a gimbal mechanism having triaxial degrees of freedom can be also used.

The hologram dry plate 234 is supported to an arm 250 and can be moved in the X and Y directions by an X stage 252 and a Y stage 254 on the base plate 235. The image forming lens 238 converges the illumination light through the liquid crystal display 232 onto a micro segment hologram region 236 on the hologram dry plate 234.

Figure 36A:
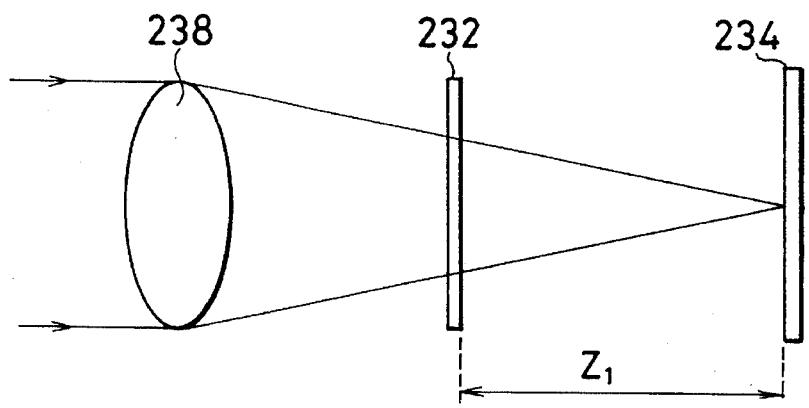
FIGS. 36A, 36B, and 36C are explanatory diagrams showing the multiple exposure of a plurality of 2-dimensional images for one segment hologram region on a hologram dry plate.
Figure 36B:
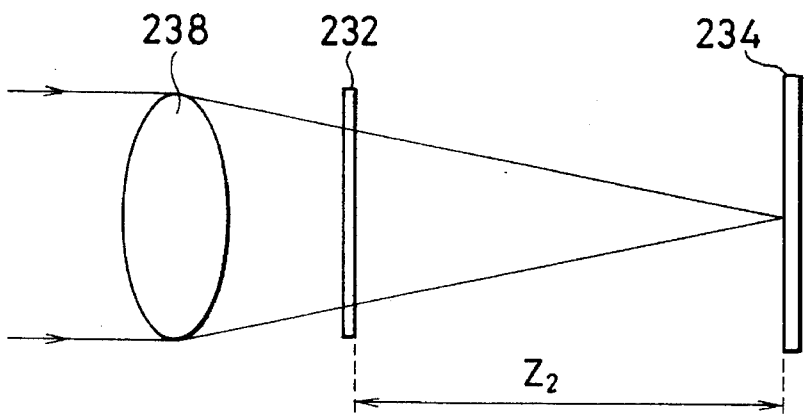
Figure 36C:
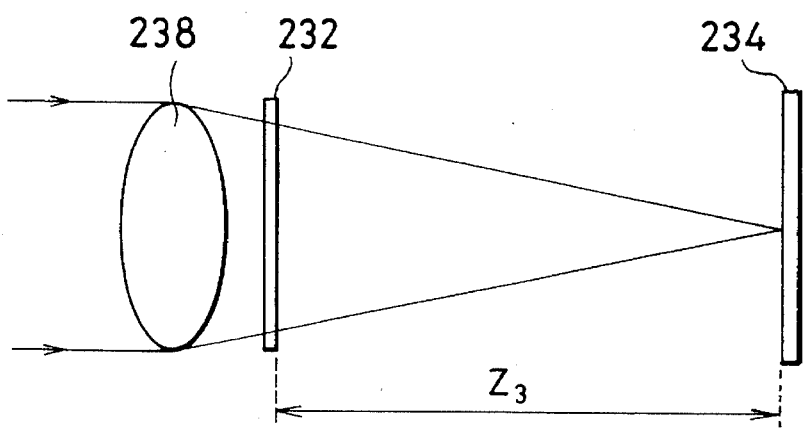

The exposing process by the flowchart of FIG. 34 will now be described with respect to the apparatus construction of FIG. 35 as follows. First, in step S1, a hologram exposing region is set. Namely, the hologram dry plate 234 is divided into microregions in a matrix form, thereby setting the segment hologram regions 236. Subsequently, a distance of the liquid crystal display 232 from the hologram dry plate 234 is set to the position in the depth direction of the 2-dimensional plane set in the figure to be first processed. The display surface of the liquid crystal display 232 is set by the rotary stage 260 into the same direction as the 2-dimensional plane set in the figure to be first processed. Subsequently, a special segment hologram region on the hologram dry plate 234 to be first exposed is matched with an optical axis 240 of the image forming lens 238. In this state, the 2-dimensional image corresponding to the segment hologram region set in the liquid crystal display 232 is displayed and a convergent light 257 is irradiated onto the liquid crystal display 232, thereby converging the displayed 2-dimensional image. At the same time, a reference light 258 which is coherent to an illuminating light 256 is irradiated by using a beam expander 255. An interference exposure is performed in step S4. In step S5, a check is made to see if the interference exposure of the 2-dimensional image has been finished or not. The interference exposure is repeated a number of times corresponding to only the number of 2-dimensional images. For example, in case of three 2-dimensional images, as shown in FIGS. 36A, 36B, and 36C, while the distance of the liquid crystal display 232 from the hologram dry plate 234 is changed into states of three 2-dimensional planes, the image corresponding to each of those planes is displayed and the interference exposure is overlapingly executed three times. When the interference exposure of all of the zones is finished in step S5, the processing routine advances to step S6. The processes are repeated from step S1 until the end of the processes for all of the exposure regions.

According to the invention as mentioned above, by obtaining a hologram expressing the phase distributions based on the 2-dimensional images divided in the 2-dimensional directions, a more natural stereoscopic display can be realized as compared with that in the conventional holographic stereogram. Since a hologram can be electronically produced from a virtual object by the CAD system and can be stereoscopically displayed, the solid image can be rewritten and displayed in a short time. A color stereoscopic display can be also easily realized.

The present invention is not limited to the above preferred embodiments but many modifications and variations are possible. The invention is also not limited by the numerical values shown in the embodiments.

What is claimed is:

1. A stereoscopic display method of a hologram, comprising:

a 3-dimensional information forming step of classifying a plurality of objects to be displayed into groups, thereby forming 3-dimensional information;

an image forming step of forming a plurality of 2-dimensional images for each of said plurality of objects which were classified into groups from said 3-dimensional information formed in said 3-dimensional information forming step;

a phase distribution calculating step of calculating a phase distribution at a hologram forming surface from said plurality of 2-dimensional images formed in said image forming step;

a hologram expressing step of expressing the phase distribution obtained in said phase distribution calculating step onto the hologram forming surface; and a wave front converting step of irradiating a reference light to the phase distribution expressed in said hologram expressing step and converting into the optical wave front, thereby displaying a solid image.

2. A method according to claim 1, wherein said image forming step comprises:

a dividing step of dividing the 3-dimensional information to be expressed as a plurality of objects;

an image data forming step of forming 3-dimensional image data of each of said divided objects from each of said plurality of 3-dimensional information divided in said dividing step;

a plane setting step of setting a 2-dimensional plane to form 2-dimensional image data for each of said divided objects; and a projecting step of forming projection image data seen from segment hologram regions as minimum units of the hologram expression which were finely divided on the hologram forming surface as 2-dimensional image data onto the 2-dimensional plane set in said plane setting step from the 3-dimensional image data for each of said divided objects.

3. A method according to claim 2, wherein in said dividing step, a plurality of objects existing at positions which are away from the hologram forming surface by distances exceeding a predetermined distance are handled as one object.

4. A method according to claim 2, wherein in said plane setting step, a plane is set so as to pass through at least the center of gravity of the figure.

5. A method according to claim 2, wherein said projecting step includes a step of enlarging a depth image.

6. A method according to claim 2, wherein said projecting step includes a step of reducing the 2-dimensional image.

7. A method according to claim 2, wherein said projecting step includes a step of setting the hologram display position to an arbitrary position.

8. A method according to claim 1, wherein said phase distribution calculating step comprises:

a space position setting step of setting a relative space position between each of 2-dimensional pixels constructing the 2-dimensional image of each of said divided plurality of objects and each of segment holograms as minimum units of the hologram expression which were finely divided on the hologram forming surface;

a phase calculating step of calculating the phase distribution at the hologram forming surface on the basis of the 2-dimensional pixels constructing said 2-dimensional image with respect to each of said segment holograms; and an adding step of adding the phase distribution at the hologram forming surface of a synthetic 2-dimensional image.

9. A method according to claim 1, wherein in said hologram expressing step, the phase distribution calculated in said phase distribution calculating step is supplied to display means arranged at the hologram forming surface and is displayed.

10. A method according to claim 1, wherein in said wave front converting step, a phase of the reference light is spatially modulated in accordance with the phase distribution given by said hologram expressing step.

11. A method according to claim 10, wherein an optical device which transmits the reference light is used in said wave front converting step.

12. A method according to claim 10, wherein an optical device for reflecting the reference light is used in said wave front converting step.

13. A method according to claim 1, wherein in said wave front converting step, an amplitude of the reference light is spatially modulated in accordance with the phase distribution given by said hologram expressing step.

14. A method according to claim 1, wherein said 3-dimensional information forming step is a step of classifying a plurality of objects to be expressed into groups and separately forming the 3-dimensional information with respect to a plurality of color components, said image forming step is a step of separately forming a plurality of 2-dimensional images for each color component, said phase distribution calculating step is a step of calculating the phase distribution for each color component, said hologram expressing step is a step of expressing the phase distribution for each color component, said wave front converting step is a step of converting the phase distribution of each color component into the optical wave front, and a color image is stereoscopically displayed by the above steps.

15. A method of forming a hologram, comprising:

a 3-dimensional information forming step of classifying a plurality of objects to be expressed into groups and forming 3-dimensional information;

an image forming step of forming a plurality of 2-dimensional images of each of said plurality of objects classified into the groups from the 3-dimensional information formed by said 3-dimensional information forming step; and an exposing step of holographically recording said plurality of 2-dimensional images expressed in said image forming step onto a recording medium.

16. A method according to claim 15, wherein said image forming step comprises:

a dividing step of dividing the 3-dimensional information to be expressed for each of said plurality of objects;

a figure data forming step of forming 3-dimensional figure data of each of said divided objects from each of said plurality of 3-dimensional information divided in said dividing step;

a plane setting step of setting a 2-dimensional plane to form 2-dimensional image data for each of said divided objects; and a projecting step of forming projection image data seen from segment hologram regions as minimum units of a hologram expression which were finely divided on the hologram forming surface onto the 2-dimensional plane set in said plane setting step as 2-dimensional image data for each segment hologram region from the 3-dimensional image data for each of said divided objects.

17. A method according to claim 16, wherein said projecting step includes a step of enlarging a depth image.

18. A method according to claim 16, wherein said projecting step includes a step of reducing a depth image.

19. A method according to claim 16, wherein said projecting step includes a step of setting the hologram display position to an arbitrary position.

20. A method according to claim 16, wherein in said plane setting step, the plane is set so as to pass through at least center of gravity.

21. A method according to claim 15, wherein said exposing step comprises:

a step of arranging the recording medium and display means for displaying the 2-dimensional images into a predetermined positional relation; and a multiple exposing step of displaying the projection image data corresponding to a segment hologram region on the recording medium by said display means, exposing the segment hologram region, and multiplexingly executing said exposure with respect to the projection image data in a plurality of directions generally perpendicular to the segment hologram region.

22. A stereoscopic display apparatus of a hologram, comprising:

3-dimensional information forming means for classifying a plurality of objects to be displayed into groups and forming 3-dimensional information;

image forming means for forming a plurality of 2-dimensional images for each of said plurality of objects classified into the groups from the 3-dimensional information formed by said 3-dimensional information forming means;

phase distribution calculating means for calculating a phase distribution at a hologram forming surface from said plurality of 2-dimensional images formed by said image forming means;

hologram expressing means for expressing the phase distribution obtained by said phase distribution calculating means onto the hologram forming surface; and wave front converting means for irradiating a reference light to the phase distribution expressed by said hologram expressing means and converting the reference light into the optical wave front, thereby displaying a solid image.

23. A stereoscopic display apparatus of a hologram, comprising:

3-dimensional information forming means for classifying a plurality of objects to be displayed into groups and forming 3-dimensional information;

image forming means for forming a plurality of 2-dimensional images for each of said plurality of objects classified into the groups from said 3-dimensional information formed by said 3-dimensional information forming means;

exposing means for holographically recording said plurality of 2-dimensional images expressed by said image forming means onto a recording medium; and wave front converting means for irradiating a reference light to the recording medium obtained by said exposing means and converting the reference light into the optical wave front, thereby displaying a solid image.

* * * * *

UNITED STATES PATENT AND TRADEMARK OFFICE
CERTIFICATE OF CORRECTION

PATENT NO. : 5,513,020
DATED : April 30, 1996
INVENTOR(S) : Masayuki KATO, et al.

It is certified that error appears in the above-indentified patent and that said Letters Patent is hereby corrected as shown below:

On the title page, item [54] and col. 1, line 1, change "USE" to --USING--.

Column 1, in Title, change "USE to --USING--.

Signed and Sealed this

Sixteenth Day of July, 1996

Attest:

BRUCE LEHMAN

*Attesting Officer*       *Commissioner of Patents and Trademarks*